United States Patent
Sudoh

(10) Patent No.: US 9,213,172 B2
(45) Date of Patent: Dec. 15, 2015

(54) ZOOM LENS UNIT AND CAMERA

(71) Applicant: Yoshifumi Sudoh, Saitama (JP)

(72) Inventor: Yoshifumi Sudoh, Saitama (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/572,973

(22) Filed: Dec. 17, 2014

(65) Prior Publication Data

US 2015/0260969 A1 Sep. 17, 2015

(30) Foreign Application Priority Data

Mar. 12, 2014 (JP) .................. 2014-049079

(51) Int. Cl.
*G02B 15/14* (2006.01)
*G02B 15/17* (2006.01)
*G02B 13/14* (2006.01)
*G02B 27/00* (2006.01)

(52) U.S. Cl.
CPC .............. *G02B 15/17* (2013.01); *G02B 13/146* (2013.01); *G02B 27/0056* (2013.01)

(58) Field of Classification Search
CPC ...... G02B 15/17; G02B 15/14; G02B 15/173; G02B 13/146; G02B 27/0056
USPC ................................. 359/683, 688
See application file for complete search history.

(56) References Cited

U.S. PATENT DOCUMENTS

| 5,627,682 | A | 5/1997 | Nagaoka |
| 5,706,138 | A | 1/1998 | Abe et al. |
| 5,786,943 | A | 7/1998 | Abe et al. |
| 5,815,322 | A | 9/1998 | Enomoto et al. |
| 6,384,985 | B1 * | 5/2002 | Hashimura .......... G02B 15/173 359/686 |
| 2007/0201144 | A1 | 8/2007 | Sudoh |
| 2007/0247726 | A1 | 10/2007 | Sudoh |
| 2008/0043342 | A1 | 2/2008 | Yamamoto et al. |
| 2008/0278779 | A1 | 11/2008 | Nishina et al. |
| 2009/0067060 | A1 | 3/2009 | Sudoh |

(Continued)

FOREIGN PATENT DOCUMENTS

| JP | 7-159693 | 6/1995 |
| JP | 9-61715 | 3/1997 |

(Continued)

OTHER PUBLICATIONS

U.S. Appl. No. 14/480,816, filed Sep. 9, 2014, Sudoh.

(Continued)

*Primary Examiner* — Scott J Sugarman
(74) *Attorney, Agent, or Firm* — Oblon, McClelland, Maier & Neustadt, L.L.P.

(57) ABSTRACT

A zoom lens unit comprises a first and fourth lens groups with positive refractive power, a second and third lens groups with negative refractive power. The first and the fourth lens groups are fixed, the second lens group moves toward an image side and the fourth lens group moves when changing a magnification ratio from a wide-angle end to a telephoto end. The fourth lens group includes a positive lens L41 having a convex surface on the object side, a negative lens L42 having a concave surface on an image side, positive lenses L43, L45, and a negative lens L44. A following condition is fulfilled:

$$0.1 < (R411-R422)/(R411+R422) < 0.6$$

where R411 represents a curvature radius of the object-side surface of the positive lens L41, and R422 represents a curvature radius of the image-side surface of the negative lens L42.

10 Claims, 14 Drawing Sheets

(56) References Cited

U.S. PATENT DOCUMENTS

| | | |
|---|---|---|
| 2009/0122418 A1 | 5/2009 | Atsuumi et al. |
| 2009/0135500 A1 | 5/2009 | Sudoh et al. |
| 2009/0147375 A1 | 6/2009 | Sudoh et al. |
| 2009/0323200 A1 | 12/2009 | Sudoh |
| 2010/0027136 A1 | 2/2010 | Ohashi et al. |
| 2010/0296180 A1 | 11/2010 | Sudoh et al. |
| 2011/0043927 A1 | 2/2011 | Sudoh |
| 2011/0051260 A1 | 3/2011 | Nakayama et al. |
| 2011/0069402 A1 | 3/2011 | Sudoh |
| 2011/0222169 A1 | 9/2011 | Sudoh |
| 2011/0228408 A1 | 9/2011 | Sudoh |
| 2011/0242648 A1 * | 10/2011 | Mizuta ................. G02B 15/173 359/376 |
| 2012/0127586 A1 | 5/2012 | Sudoh |
| 2013/0003189 A1 | 1/2013 | Sanjo et al. |
| 2014/0293457 A1 | 10/2014 | Sudoh |

FOREIGN PATENT DOCUMENTS

| | | |
|---|---|---|
| JP | 9-61716 | 3/1997 |
| JP | 10-54937 | 2/1998 |
| JP | 2006-30582 | 2/2006 |
| JP | 2008-46319 | 2/2008 |
| JP | 2013-33242 | 2/2013 |

OTHER PUBLICATIONS

U.S. Appl. No. 14/510,238, filed Oct. 9, 2014, Sudoh.
U.S. Appl. No. 14/584,167, filed Dec. 29, 2014, Sudoh.
U.S. Appl. No. 14/445,408, filed Jul. 29, 2014.
U.S. Appl. No. 14/480,816, filed Sep. 9, 2014, Sudoh.

* cited by examiner

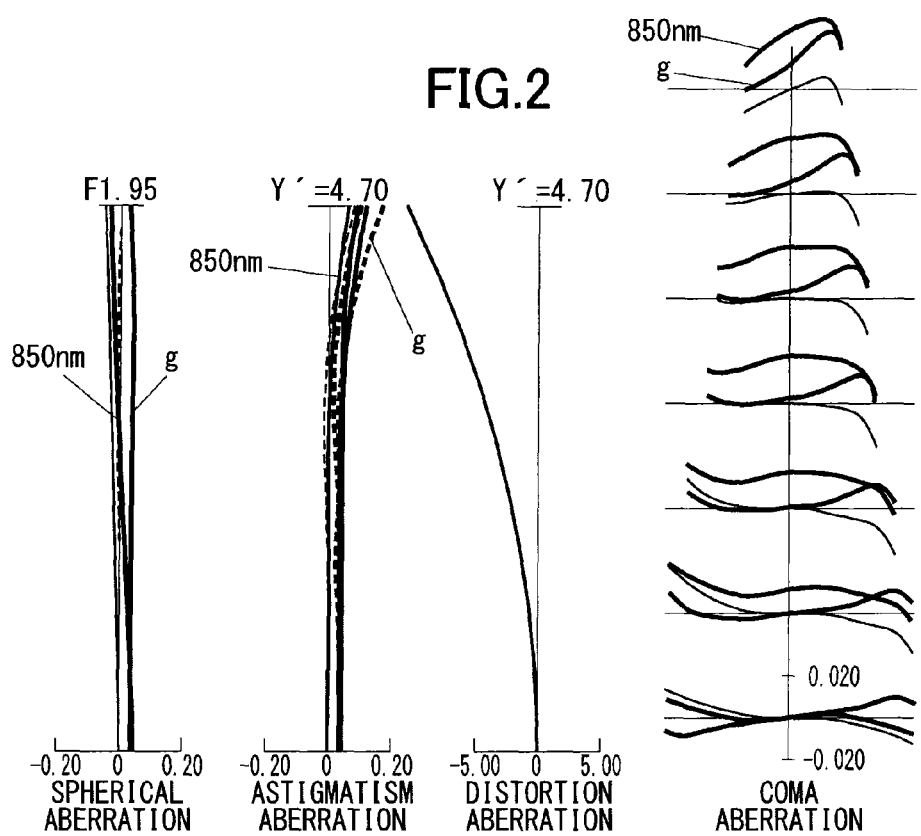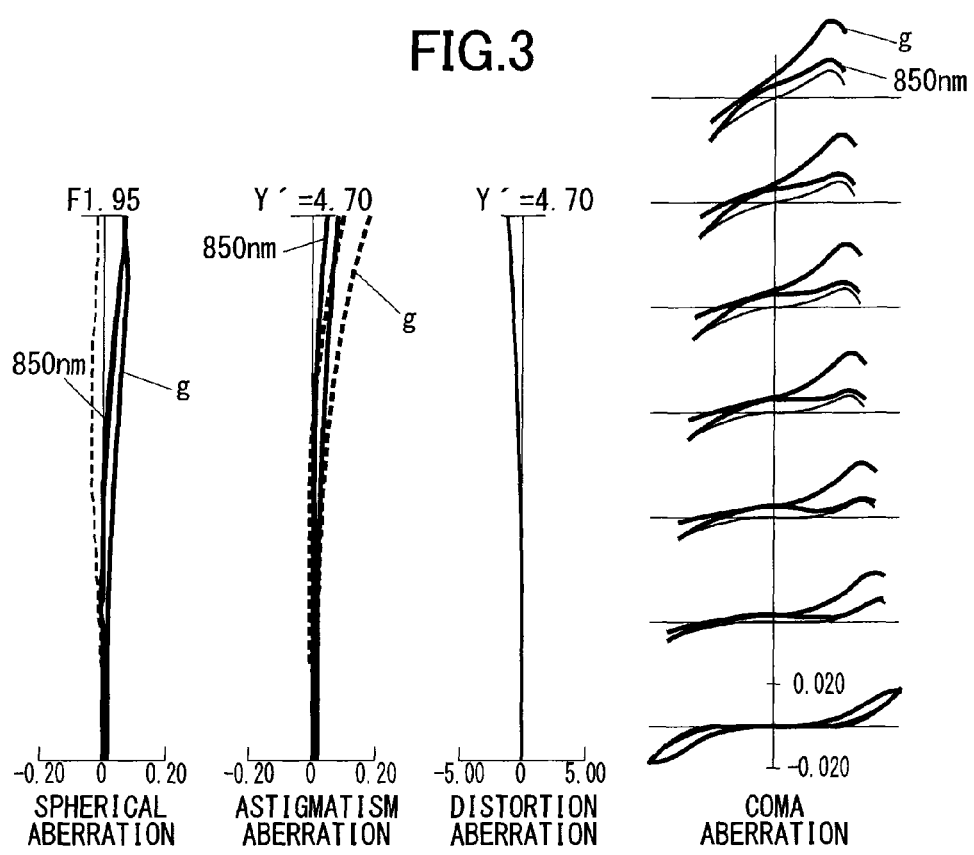

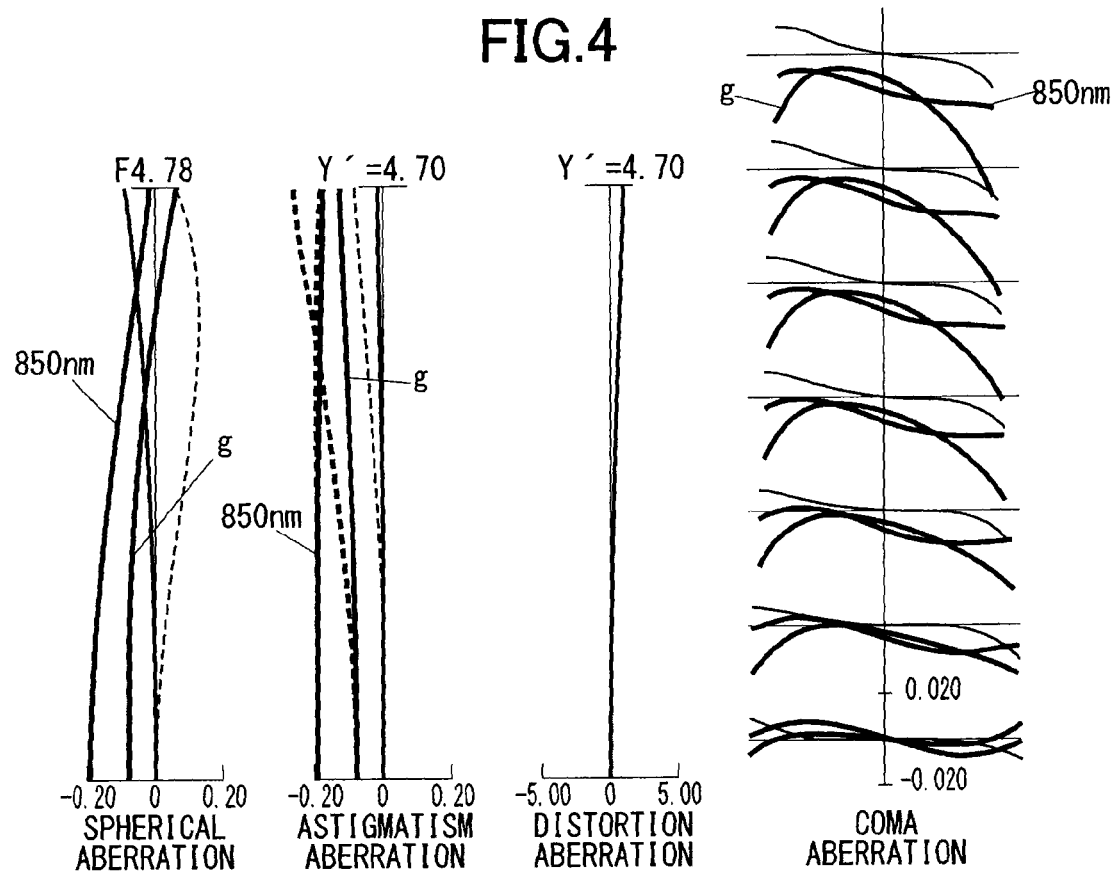

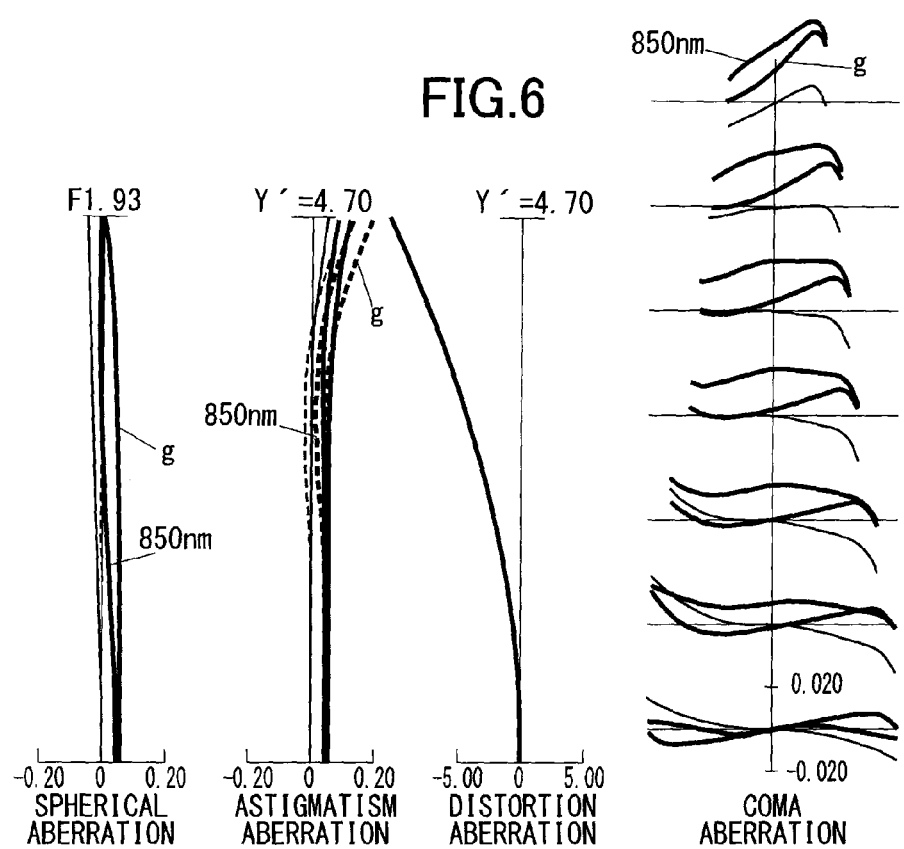
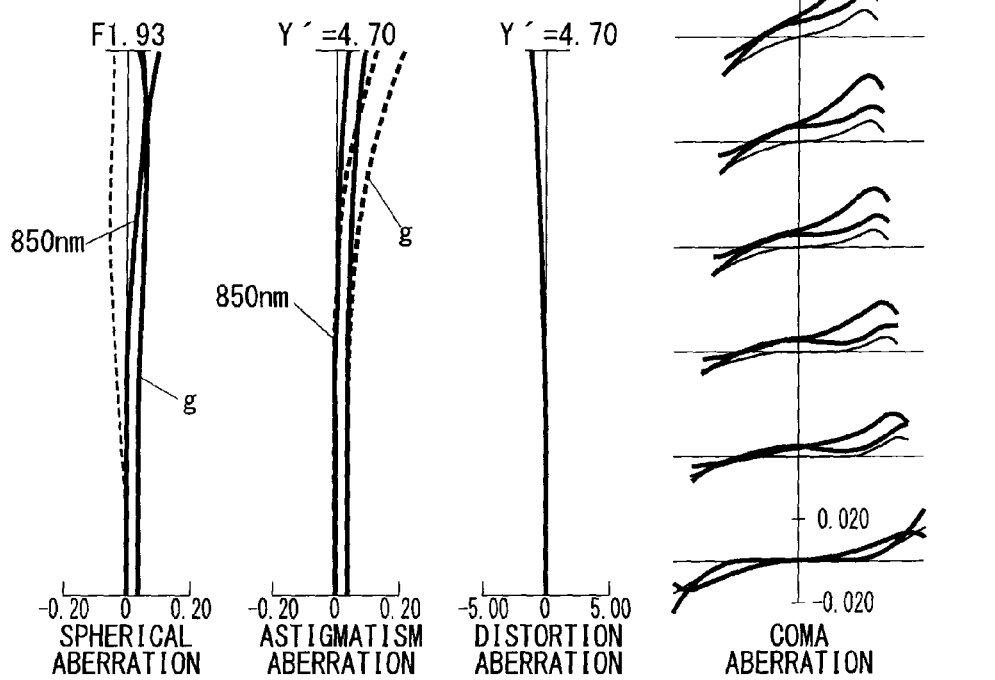

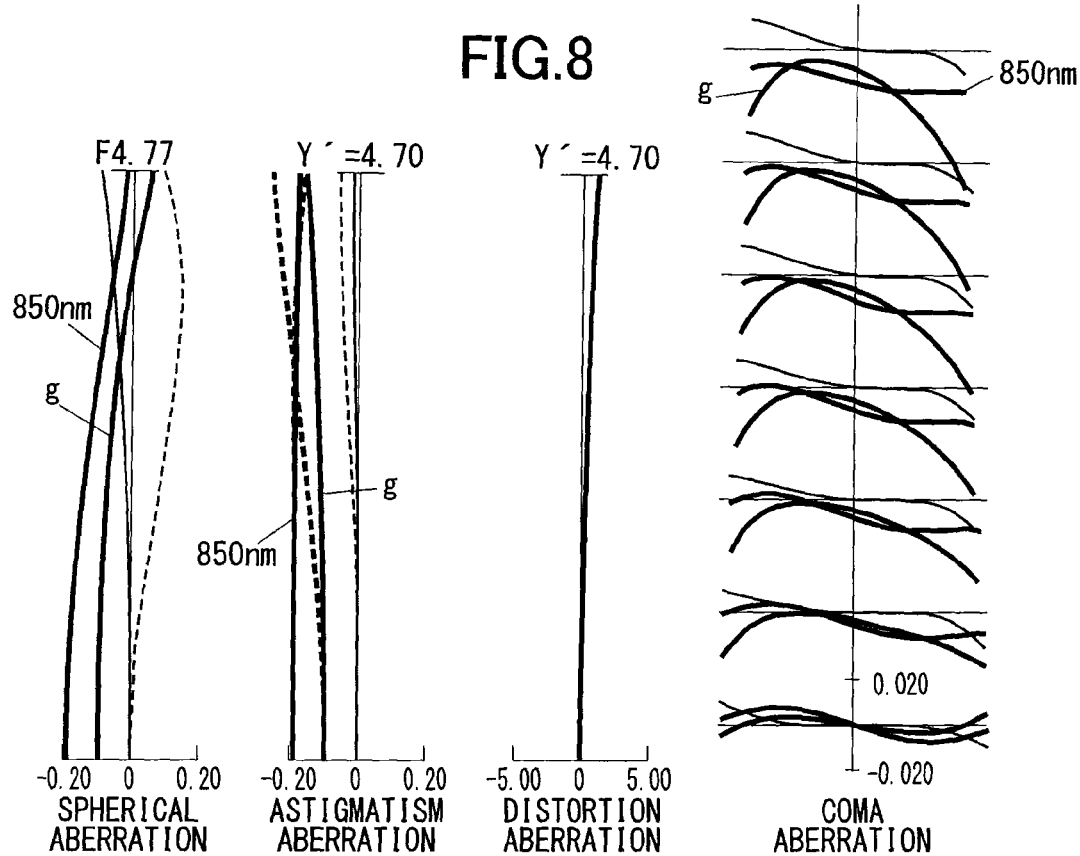

FIG.10
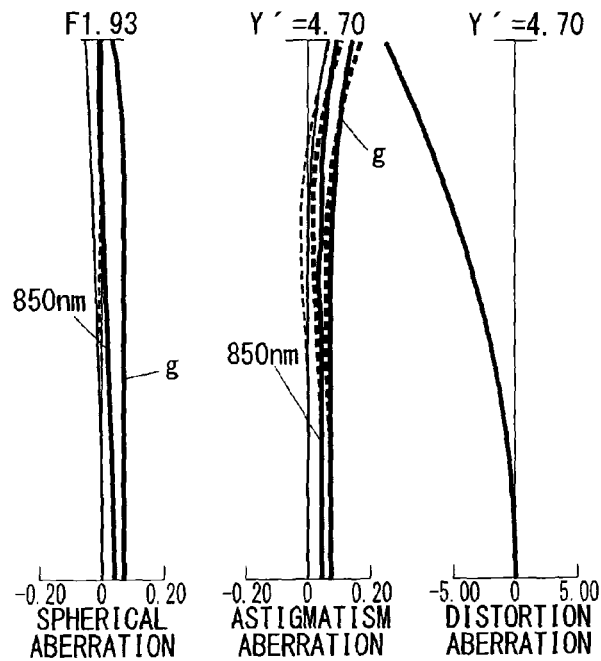
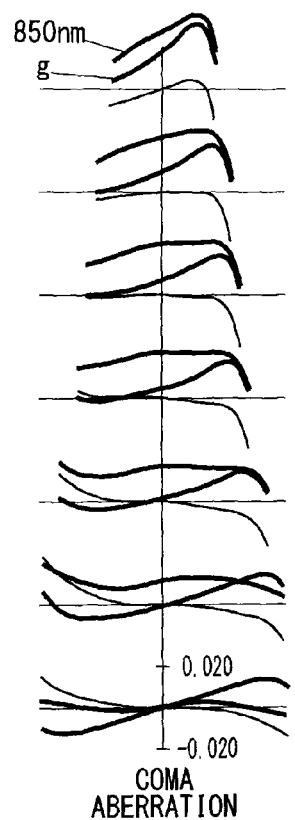
FIG.11
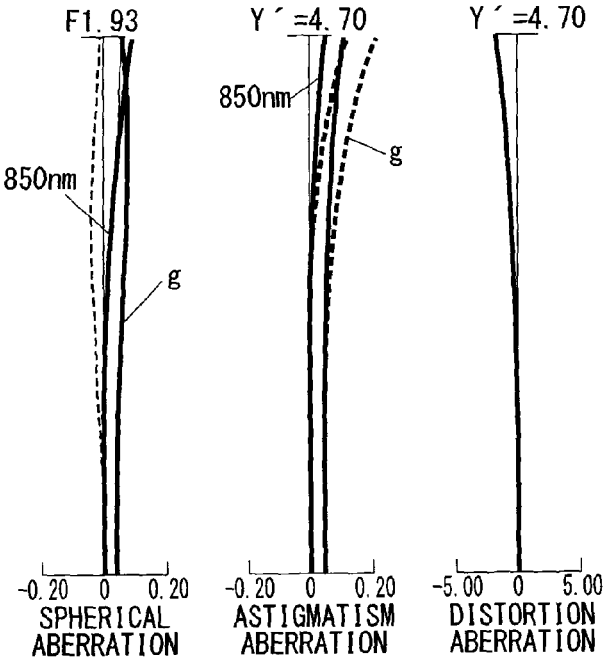
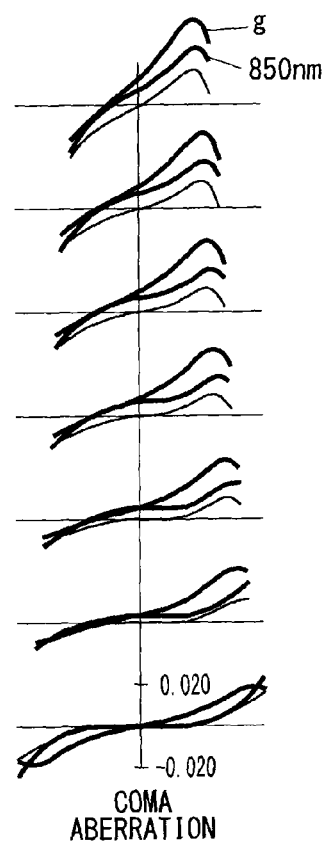

FIG.14
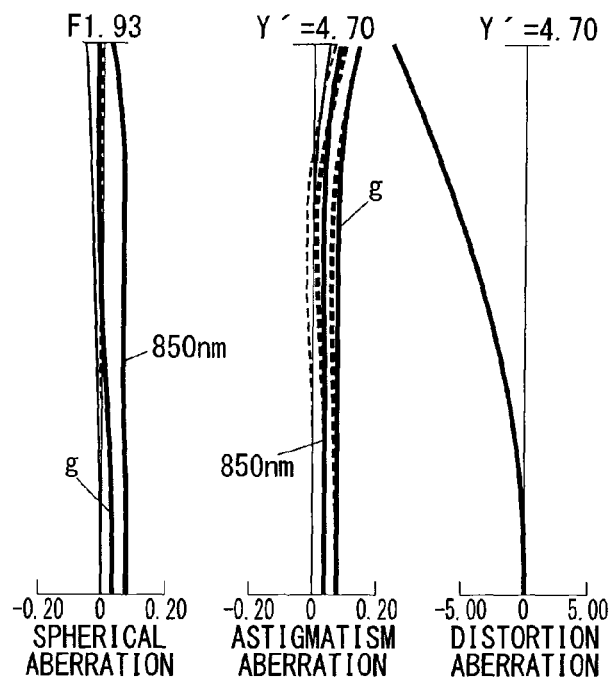
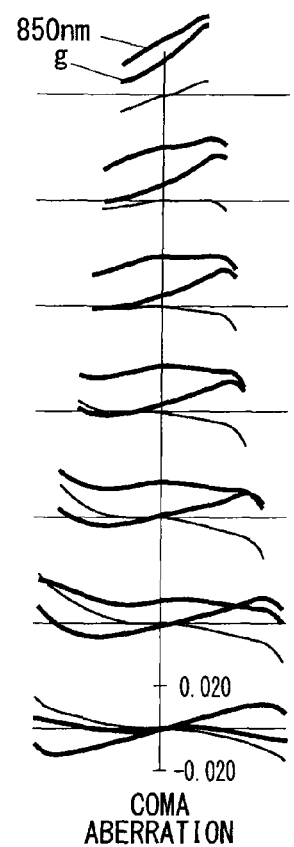
FIG.15
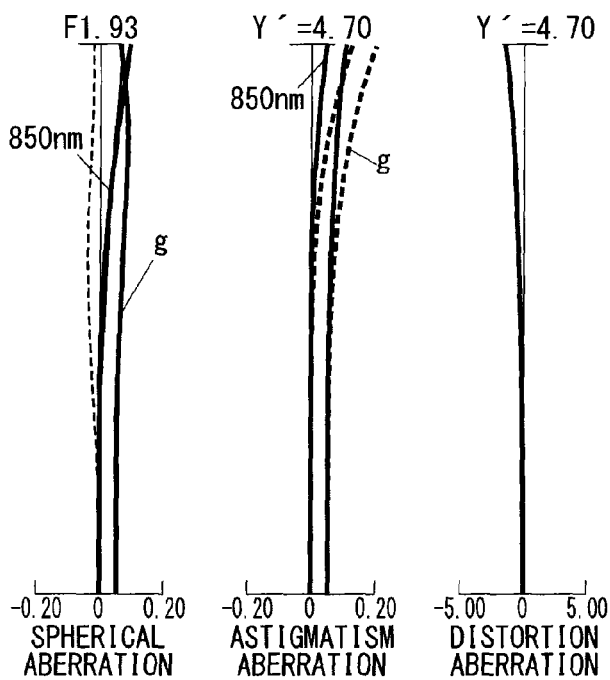
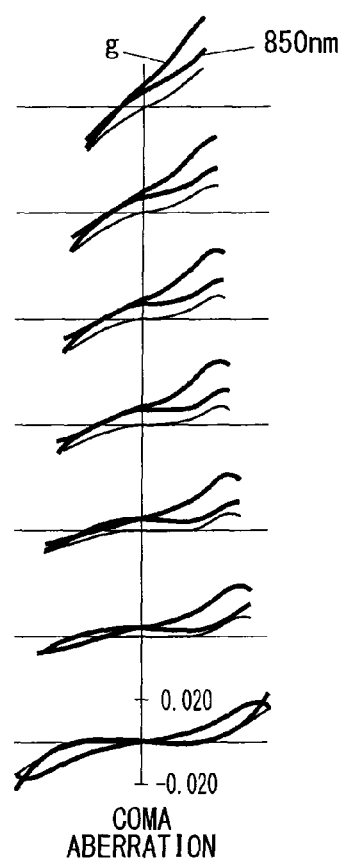

ZOOM LENS UNIT AND CAMERA

CROSS-REFERENCE TO RELATED APPLICATIONS

The present application is based on and claims priority from Japanese Patent Application Number 2014-049079, filed Mar. 12, 2014, the disclosure of which is hereby incorporated by reference herein in its entirety.

BACKGROUND

The present invention relates to a zoom lens unit, and a camera using the zoom lens unit as an imaging optical system for still images and/or for videos.

In recent years, a market of imaging devices (e.g., cameras) used for a security usage, etc. has grown, and requests or/and requirements from users are being various and diversified. Especially, most of the users demand a camera with higher image quality (resolution) and high magnification ratio, and it is highly important to achieve both of the high image resolution (high image resolving power) and high magnification ratio for zoom lens units used for photographing lenses.

To achieve the high image resolution, the zoom lens unit should have a resolving power compatible with the image pickup element of at least 1,000,000 to 5,000,000 pixels in the entire zooming range. Further, for the high magnification ratio, the zoom lens unit should have a magnification ratio of approximately 20 times.

Additionally, it is desirable that aberrations of the lens are sufficiently corrected even in the near-infrared light range, such that it enables to take an image under a dark environment.

Furthermore, it is also desirable to provide a zoom lens unit with a large diameter having an F number equal to or smaller than 2.0 at the short focal length end (also called "wide-angle end").

Conventionally, a zoom lens unit with a large diameter, which includes, in order from an object side to the image side, a first lens group with positive refractive power, a second lens group with negative refractive power, a third lens group with negative refractive power, and a fourth lens group with positive refractive power having 7 to 8 lenses, is taught by Japanese Laid-Open Patent Applications No. 2006-030582 (Document 1), No. 1997(Hei09)-61715 (Document 2), No. 1997(Hei09)-61716 (Document 3), No. 1995(Hei07)-159693 (Document 4), No. 1998(Hei10)-054937 (Document 5), etc.

However, the zoom lens units disclosed in Documents 1 to 4 do not have a magnification ratio of approximately 20 times.

Further, even in Document 5, which might be considered as the closest reference to the embodiments of the present invention, aberration correction in the infrared light range is not considered at all.

SUMMARY

As explained above, none of Documents 1 to 5 discloses a technique that can satisfy or fulfill the requirements from users, particularly the requirements of correcting the aberration sufficiently in the infrared light range.

An object of the embodiments of this invention is, therefore, to provide a compact zoom lens unit which has a high image resolution and a high magnification ratio, and further enables to correct the aberration sufficiently in the infrared light range.

To achieve the above object, one aspect of embodiments of the present invention provides a zoom lens unit comprising, in order from an object side, a first lens group with positive refractive power; a second lens group with negative refractive power; a third lens group with negative refractive power; and a fourth lens group with positive refractive power, wherein the first and fourth lens group are fixed, while the second lens group moves toward an image side and the fourth lens group moves when changing a magnification ratio from a wide-angle end to a telephoto end, and the fourth lens group includes, in order from the object side, a positive lens L41 having a convex surface on the object side, a negative lens L42 having a concave surface on an image side, a positive lens L43, a negative lens L44, and a positive lens L45, and fulfills a following condition:

$$0.1 < (R411 - R422)/(R411 + R422) < 0.6$$

where R411 represents a curvature radius of the object-side surface of the positive lens L41, and R422 represents a curvature radius of the image-side surface of the negative lens L42.

BRIEF DESCRIPTION OF THE DRAWINGS

FIG. 2 shows graphs drawing curves of spherical aberration, astigmatism aberration, distortion aberration, and coma aberration at the wide-angle end of the zoom lens unit according to Embodiment 1 shown in FIG. 1A;

FIG. 3 shows graphs drawing curves of spherical aberration, astigmatism aberration, distortion aberration, and coma aberration at the intermediate focal distance of the zoom lens unit according to Embodiment 1 shown in FIG. 1B;

FIG. 4 shows graphs drawing curves of spherical aberration, astigmatism aberration, distortion aberration, and coma aberration at the telephoto end of the zoom lens unit according to Embodiment 1 shown in FIG. 1C;

FIG. 6 shows graphs drawing curves of spherical aberration, astigmatism aberration, distortion aberration, and coma aberration at the wide-angle end of the zoom lens unit according to Embodiment 2 shown in FIG. 5A;

FIG. 7 shows graphs drawing curves of spherical aberration, astigmatism aberration, distortion aberration, and coma aberration at the intermediate focal distance of the zoom lens unit according to Embodiment 2 shown in FIG. 5B;

FIG. 8 shows graphs drawing curves of spherical aberration, astigmatism aberration, distortion aberration, and coma aberration at the telephoto end of the zoom lens unit according to Embodiment 2 shown in FIG. 5C;

FIG. 10 shows graphs drawing curves of spherical aberration, astigmatism aberration, distortion aberration, and coma aberration at the wide-angle end of the zoom lens unit according to Embodiment 3 shown in FIG. 9A;

FIG. 11 shows graphs drawing curves of spherical aberration, astigmatism aberration, distortion aberration, and coma aberration at the intermediate focal distance of the zoom lens unit according to Embodiment 3 shown in FIG. 9B;

FIG. 14 shows graphs drawing curves of spherical aberration, astigmatism aberration, distortion aberration, and coma aberration at the wide-angle end of the zoom lens unit according to Embodiment 4 shown in FIG. 13A;

FIG. 15 shows graphs drawing curves of spherical aberration, astigmatism aberration, distortion aberration, and coma aberration at the intermediate focal distance of the zoom lens unit according to Embodiment 4 shown in FIG. 13B;

DETAILED DESCRIPTION OF THE PREFERRED EMBODIMENTS

Figure 1A:
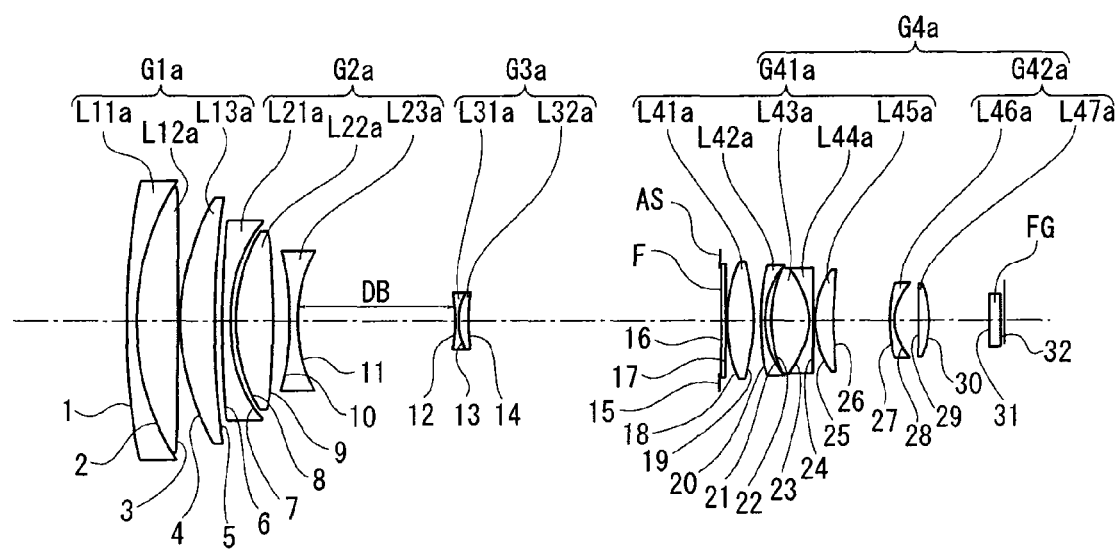
FIG. 1A is a cross-section view illustrating an arrangement of optical system (lenses) at a wide-angle end (short focal length end) of a zoom lens unit according to Embodiment 1.

Hereinafter, a zoom lens unit and a camera according to embodiments of the present invention will be explained with reference to the drawings.

Prior to explaining the specific and detailed configurations of the embodiments, a principle of the present invention is explained herewith.

A zoom lens unit according to the present invention includes, in order from an object side (the left side in FIGS. 1A to 1C) to an image side (the right side therein), a first lens group with positive refractive power, a second lens group with negative refractive power, a third lens group with negative refractive power, and a fourth lens group with positive refractive power. In other words, the zoom lens unit arranges four lens groups from the object side to the image side with positive, negative, negative, and positive refractive power. The second lens group is configured as variator lenses, which play a leading role for changing the magnification ratio.

When changing (adjusting) the magnification ratio from the short focal length end (wide-angle end) to the long focal length end (telephoto end), the second lens group moves toward the image side and the third lens group moves toward the image side or the object side, while the first and fourth lens groups are fixed. That is to say, an interval between the first lens group and the second lens group increases, and an interval between the second lens group and the third lens group changes (increases or decreases) accordingly.

To achieve the zoom lens unit with a large diameter at the wide-angle end, a configuration of the fourth lens group, which has a large effective diameter of luminous flux at the wide-angle end, is an important factor. Also, to reduce focus fluctuation at the wide-angle end in both the visible light range and the near-infrared light range, an axial chromatic aberration needs to be corrected efficiently and sufficiently.

Therefore, in the embodiments of the present invention, the fourth lens group is configured to include, in order from the object side, a positive lens L41 having a convex surface on the object side, a negative lens L42 having a concave surface on the image side, a positive lens L43, a negative lens L44, and a positive lens L45. With this, it becomes possible to reduce or suppress the axial chromatic aberration at the wide-angle end and to correct spherical aberration, coma aberration, and the like sufficiently.

Further, the object-side surface of the positive lens L41 and the image-side surface of the negative lens L42 are designed to correct (to cancel out) the aberrations of the lenses each other. In other words, a relation of curvature radiuses thereof is important.

Thus, it is preferable for the zoom lens unit (specifically, the fourth lens group) to fulfill the following condition (equation) (1):

$$0.1 < (R411 - R422)/(R411 + R422) < 0.6 \quad (1)$$

where R411 represents a curvature radius of the object-side surface of the positive lens L41, and R422 represents a curvature radius of the image-side surface of the negative lens L42.

By fulfilling the above condition (1), it becomes possible to sufficiently correct the every aberration.

Further, it is more preferable for the zoom lens unit to fulfill the following condition (1)'.

$$0.1 < (R411 - R422)/(R411 + R422) < 0.5 \quad (1)'$$

In addition, to further correct the axial chromatic aberration at the wide-angle end, an optical material having anomalous dispersion property can be used for at least one of the positive lenses in the fourth lens group.

It is preferable for one of the positive lenses having anomalous dispersion property to fulfill the following conditions (2) (3) and (4).

$$1.40 < N_d < 1.65 \quad (2)$$

$$65.0 < v_d < 100.0 \quad (3)$$

$$0.015 < P_{g,F} - (-0.001802 \times v_d + 0.6483) < 0.060 \quad (4)$$

where $N_d$ represents a refractive index of the positive lens, $v_d$ represents an Abbe number of the positive lens, and $P_{g,F}$ represents a partial dispersion ratio of the positive lens and is expressed as: $P_{g,F} = (n_g - n_F)/(n_F - n_C)$, where $n_g$, $n_F$, and $n_C$ represent refractive indexes at g-line, F-line, and C-line of the positive lens respectively.

It becomes possible to sufficiently correct chromatic aberration by using an optical material that can fulfill the conditions (2) (3) and (4), specifically an optical material that has high (strong) anomalous dispersion property with low dispersion property (i.e., extra-low partial dispersion property).

Preferably, the fourth lens group is configured to classify the lenses into a fourth front lens group and a fourth latter lens group by dividing the lenses at a position where a gap between the lenses in the fourth lens group is the widest, and to use the optical material having the anomalous dispersion property for one of the positive lenses of the fourth front lens group in which the effective diameter of luminous flux is largest, thereby improving the correction of the axial chromatic aberration.

Further, to correct the axial chromatic aberration at the wide-angle end more effectively, it is preferable for the zoom lens unit to use at least two positive lenses that fulfills the conditions (2) (3) and (4) in the fourth lens group. To be more specific, it is preferable for the zoom lens unit to have the positive lenses L41, L43, and L45 in the fourth lens group that fulfill the conditions (2) (3) and (4) since their effective diameters of luminous flux are relatively large, thereby having better anomalous dispersion effects.

Furthermore, to correct the every aberration sufficiently, it is preferable for the positive lens L43 and the negative lens L44 in the fourth group to be cemented and to fulfill the following condition:

$$-4.0 < Rcom/(N44-N43)/f41 < -1.0 \qquad (5)$$

where Rcom represents the curvature radius of the cemented surface of the cemented lens composed of the positive lens L43 and negative lens L44, N43 represents a refractive index of the positive lens L43 in the fourth lens group, N44 represents a refractive index of the negative lens L44 in the fourth lens group, and f41 represents a focal length of the positive lens L41 in the fourth lens group.

The cemented surface of the positive lens L43 and negative lens L44 is configured to correct (cancel out) the spherical aberration, coma aberration, etc. of each other, and by fulfilling the above condition (5), it becomes possible to correct the every aberration in a well-balanced manner.

Further, to correct the every aberration efficiently, it is preferable for the zoom lens unit to fulfill the following condition (6):

$$-0.8 < f41/f42 < -0.4 \qquad (6)$$

where f42 represents a focal length of the negative lens L42 in the fourth lens group.

Since the image-side surfaces of the positive lens L41 and negative lens L42 are configured to correct (cancel out) the aberration of each other, it becomes possible to correct the every aberration sufficiently by fulfilling the above condition (6).

Furthermore, to correct the every aberration more efficiently, it is preferable for the zoom lens unit to fulfill the following conditions (7) and (8):

$$-1.2 < f43/f44 < -0.17 \qquad (7)$$

$$-2.5 < f45/f44 < -1.5 \qquad (8)$$

where f43 represents a focal length of the positive lens L43 in the fourth lens group, f44 represents a focal length of the negative lens L44 in the fourth lens group, and f45 represents a focal length of the positive lens L45 in the fourth lens group.

It becomes possible to correct the axial chromatic aberration at the wide-angle end and the other every aberration more efficiently by fulfilling the above conditions (7) and (8).

Additionally, to correct the every aberration more efficiently, it is preferable for the zoom lens unit to configure the fourth lens group to arrange the fourth front lens group on the object side and the fourth latter lens group on the image side. The fourth front lens group includes, in order from the object side to the image side, the positive lens L41 having the convex surface on the object side, the negative lens L42 having the concave surface on the image side, the positive lens L43, the negative lens L44, and the positive lens L45; while the fourth latter lens group includes, in order from the object side to the image side, a negative lens L46 and a positive lens L47.

Since the fourth front lens group has image-forming function and has a large diameter, with the configuration as mentioned above, it becomes possible to correct the spherical aberration and/or coma aberration efficiently and sufficiently. Further, with the fourth latter lens group, it is possible to adjust its exit pupil position appropriately and to correct the other aberrations generated in the fourth front lens group sufficiently.

To correct the axial chromatic aberration at the telephoto end, it is preferable for the first lens group to have a diffraction lens surface and fulfill the following condition (9).

$$100 < f1doe/f1 < 400 \qquad (9)$$

where f1doe represents a focal length of the diffraction lens surface in the first lens group, and f1 represents a focal length of the first lens group.

As is known, a focal length f of a diffraction lens is expressed as:

$$f = -1/(2 \times C2)$$

where C2 is a coefficient of 2nd order in a phase function.

Since the axial light beam (collimated beam of light) passing through the first lens group is the highest (largest) among the axial light beams passing through the lens groups at the telephoto end, it is preferable to use a diffraction lens surface in the first lens group to correct the axial chromatic aberration efficiently at the telephoto end.

Laminated type diffraction optical elements can be used for the diffraction lens surface. By laminating the diffraction optical elements to have appropriate differences of the refraction indexes for each wavelength, it becomes possible to improve the diffraction efficiency in a broad wavelength range.

Also, as explained later, the optical elements can be adhered to the lens surface. Besides, it is possible to have the diffraction structure on a cemented surface of the lenses, thereby improving environmental resistance.

Further, it is possible to correct the axial chromatic aberration appropriately by fulfilling the condition (9).

It should be noted that focusing adjustments should be carried out by the first lens group.

Adjusting the focus through the first lens group can reduce focus fluctuation while changing the zoom positions. Further, adjusting the focus through the first lens group can reduce a moving amount for adjusting the focus in response to focus fluctuation caused by a temperature range at the telephoto end.

Next, specific embodiments based on the abovementioned principle will be explained. Embodiments 1 to 4 mentioned below are numerical examples. FIGS. 1A to 4 show the zoom lens unit according to first Embodiment, and FIGS. 5A to 8 show the zoom lens unit according to second Embodiment.

FIGS. 9A to 12 show the zoom lens unit according to third Embodiment, and FIGS. 13A to 16 show the zoom lens unit according to fourth Embodiment.

The zoom lens units of Embodiments 1 to 4 all include, in order from the object side to the image side, a first lens group with positive refractive power, a second lens group with negative refractive power, a third lens group with negative refractive power, and a fourth lens group with positive refractive power, i.e., the zoom lens unit arranges four lens groups with positive, negative, negative, and positive refractive power.

In the zoom lens unit for each of Embodiments 1 to 4, an optical element, which is made of a parallel flat plate and disposed on the image side in the fourth lens group, corresponds to an optical filter (e.g., an optical low-pass filter or a UV cut-off optical filter) or a cover glass (sealing glass) of a photo acceptance element (e.g., a complementary metal-oxide semiconductor (CMOS) imaging sensor or a charge-coupled device (CCD) imaging sensor). In the drawings, a filter FG is shown as an equivalent transparent parallel flat plate.

An optical element composed of another parallel flat plate, which is disposed between the object and an aperture stop AS or between the image plane IP and aperture stop AS, corresponds to an ND filter F, which is used for adjusting light amount (exposure amount).

Note that "OHARA" mentioned in the following Tables for explaining Embodiments 1 to 4 refers to a glass manufacture, OHARA Inc., and the names of the glasses denote their products names.

It should be noted that aberrations of each zoom lens unit according to Embodiments 1 to 4 are sufficiently corrected, and the zoom lens units have the resolving power compatible with the image pickup devices of 1,000,000 to 5,000,000 pixels or more. In other words, it is possible to achieve high imaging performance and compactness by configuring zoom lens unit in accordance with Embodiments 1 to 4 of the present invention.

Numerical codes and symbols used hereinafter represent as follows:
f: total focal length of the optical system
F: F-number
ω: half-field angle
R: curvature radius
D: distance (interval) between lens surfaces
$N_d$: refractive index
$v_d$: Abbe number
C2: coefficient of 2nd order in the phase function
C4: coefficient of 4th order in the phase function
A structure of the diffraction grating is expressed by the following equation:

$$\varphi(h)=(2\pi/\lambda d)(C2 \cdot h^2 + C4 \cdot h^4)$$

where λd represents a reference wavelength (d-line), h represents a height from the optical axis, and φ(h) represents a phase.

Embodiment 1

Figure 1B:
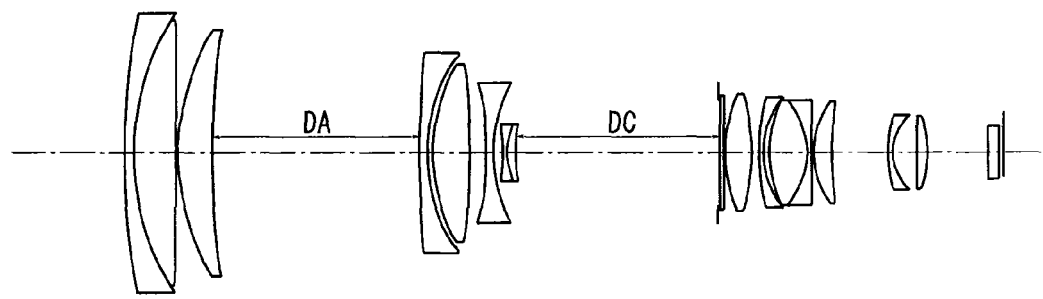
FIG. 1B is a cross-section view illustrating an arrangement of optical system (lenses) at an intermediate focal distance of the zoom lens unit according to Embodiment 1.
Figure 1C:
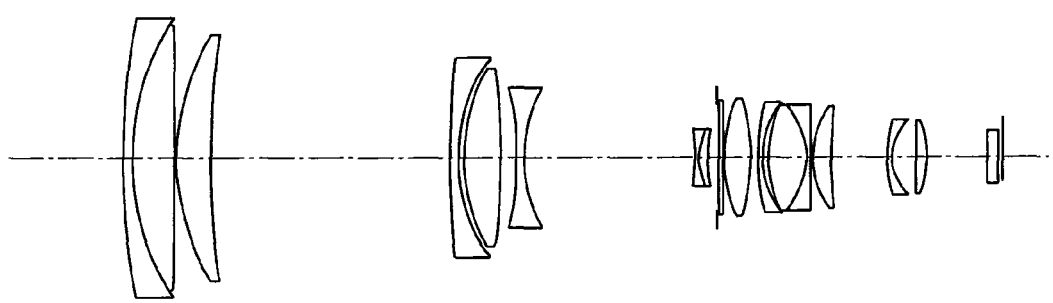
FIG. 1C is a cross-section view illustrating an arrangement of optical system (lenses) at a telephoto end (long focal length end) of the zoom lens unit according to Embodiment 1.

FIGS. 1A to 1C show overall arrangements of the zoom lens unit and a zooming trajectory of each lens group from a short focal length end (wide-angle end) to a long focal length end (telephoto end) through a predetermined intermediate focal length, in accordance with the first Embodiment. To be specific, FIG. 1A shows an arrangement of the lenses at the wide-angle end, FIG. 1B shows an arrangement of the lenses at the intermediate focal length, and FIG. 1C shows an arrangement of the lenses at the telephoto end. Note that in FIGS. 1A to 1C, an object side is on the left side and an image plane side is on the right side.

The zoom lens unit shown in FIGS. 1A to 1C includes, in order from the object side, a first lens group G1a with positive refractive power, a second lens group G2a with negative refractive power, a third lens group G3a with negative refractive power, and a fourth lens group G4a with positive refractive power.

The fourth lens group G4a includes a fourth front lens group G41a, which is disposed on the object side than a position where a gap between the lenses in the fourth lens group G4a is the widest (in other words, the forth front lens group G41a is disposed between an aperture stop (AS) and the widest gap), and a fourth latter lens group G42a, which is disposed between the widest gap and the image plane.

Each of the first to fourth lens groups G1a to G4a of the zoom lens unit is supported by a supporting member (not shown). Each of the second lens group G2a and the third lens group G3a integrally moves when zooming, etc., and the aperture stop AS is integrally installed with the fourth lens group G4a. In FIGS. 1A to 1C, surface numbers of the optical materials (lenses) are also shown for convenience.

When changing the magnification rate from the wide-angle end to the telephoto end; the second lens group G2a moves toward the image side and the third lens group G3a moves toward the image side or the object side on the optical axis, while the first and fourth lens groups G1a, G4a are fixed. Accordingly, an interval between the first lens group G1a and the second lens group G2a increases, and an interval between the second lens group G2a and the third lens group G3a changes (increases or decreases) accordingly.

In Embodiment 1 shown in FIGS. 1A to 1C, the first lens group G1a of the zoom lens unit includes, in order from the object side, a negative meniscus lens L11a having a concave surface on the image plane side, a positive biconvex lens L12a having a smaller convex surface on the object side (i.e., the curvature radius on the object side of the positive biconvex lens L12a is smaller than the curvature radius on the image plane side thereof), and a positive meniscus lens L13a having a convex surface on the object side.

A laminated type diffraction optical element is adhered to a lens surface of the first lens group G1a, specifically on the cemented surface 2 of the negative lens L11a and the positive lens L12a.

Further, the negative lens L11a and the positive lens L12a of the first lens group G1a are closely contacted and bonded to each other to form a cemented lens.

The second lens group G2a of the zoom lens unit according to Embodiment 1 includes, in order from the object side, a negative meniscus lens L21a having a concave surface on the image plane side, a positive biconvex lens L22a having a smaller convex surface on the object side (i.e., the curvature radius on the object side of the positive biconvex lens L22a is smaller than the curvature radius on the image plane side thereof), and a negative biconcave lens L23a having a smaller concave surface on the image plane side (i.e., the absolute value of the curvature radius on the image plane side of the negative biconcave lens L23a is smaller than the absolute value of the curvature radius on the object side thereof).

The third lens group G3a of the zoom lens unit according to Embodiment 1 includes, in order from the object side, a negative biconcave lens L31a having a smaller concave surface on the image plane side (i.e., the absolute value of the curvature radius on the image plane side of the negative biconcave lens L31a is smaller than the absolute value of the curvature radius on the object side thereof), and a positive meniscus lens L32a having a convex surface on the object side.

The negative lens L31a and the positive lens L32a of the third lens group G3a are closely contacted and bonded to each other to form a cemented lens.

The aperture stop AS is interposed between the third lens group G3a and the fourth lens group G4a, and filters F such as an ND filter composed of a parallel plate are also interposed therebetween adjacently to the aperture stop AS. The aperture stop AS and the filters F are integrally supported (held) by the support member together with the fourth lens group G4a.

The fourth front lens group G41a, which is disposed on the object side than a position where a gap between the lenses in the fourth lens group G4a is the widest (in other words, the forth front lens group G41a, which is disposed between the aperture stop (AS) and the widest gap), includes, in order from the object side, a positive biconvex lens L41a having a smaller convex surface on the object side (i.e., the curvature radius on the object side of the positive biconvex lens L41a is smaller than the curvature radius on the image plane side thereof), a negative meniscus lens L42a having a concave surface on the image plane side, a positive biconvex lens L43a having a smaller convex surface on the image plane surface (i.e., the curvature radius on the image plane side of the positive biconvex lens L43a is smaller than the curvature radius on the object side thereof), a negative meniscus lens L44a having a concave surface on the object side, and a positive meniscus lens L45a having a convex surface on the object side.

The positive lens L43a and the negative lens L44a of the fourth front lens group G4a are closely contacted and bonded to each other and form a cemented lens.

Further, the fourth latter lens group G42a, which is disposed between the widest gap and the image plane, includes, in order from the object side, a negative meniscus lens L46a having a concave surface on the image plane side, and a positive biconvex lens L47a having a smaller convex surface on the image plane side (i.e., the curvature radius on the image plane side of the positive biconvex lens L47a is smaller than the curvature radius on the object side).

Optical filters such as an optical low-pass filter and an optical infrared cut-off filter, and/or a cover glass (sealing glass) of a photo acceptance element such as a CMOS imaging sensor and a CCD imaging sensor are disposed in the fourth latter lens group G42a. In the drawings, a filter FG is shown as an equivalent transparent parallel flat plate.

It is preferable to adjust the focusing by the first lens group G1a since the position of the first lens group G1a used for the focusing adjustments does not change for the whole zooming range even if the first lens group G1a is used to adjust the focusing.

In Embodiment 1, the total focal length f of the optical system changes from 15.45-70.34-320.15 mm, the F-number F changes from 1.95-1.95-4.78, and a half-field angle ω changes from 18.80-3.87-0.83 degrees respectively when zooming from the wide-angle end to the telephoto end through the intermediate focal length. Optical characteristics of each optical element are shown in the following Table 1.

TABLE 1

| LENS SURFACE | R | D | N | ν | GLASS |
|---|---|---|---|---|---|
| 1 | 194.668 | 2.80 | 1.74950 | 35.33 | S-NBH51(OHARA) |
| 2* | 72.770 | 11.49 | 1.60300 | 65.44 | S-PHM53(OHARA) |

TABLE 1-continued

| LENS SURFACE | R | D | N | ν | GLASS |
|---|---|---|---|---|---|
| 3 | −1353.778 | 0.50 | | | |
| 4 | 66.942 | 9.21 | 1.49700 | 81.54 | S-FPL51(OHARA) |
| 5 | 283.989 | DA | | | |
| 6 | 424.184 | 2.00 | 1.74950 | 35.28 | S-LAM7(OHARA) |
| 7 | 47.059 | 1.62 | | | |
| 8 | 50.468 | 10.04 | 1.75520 | 27.51 | S-TIH4(OHARA) |
| 9 | −189.709 | 4.62 | | | |
| 10 | −81.220 | 2.00 | 1.71300 | 53.87 | S-LAL8(OHARA) |
| 11 | 44.513 | DB | | | |
| 12 | −57.924 | 1.20 | 1.74950 | 35.28 | S-LAM7(OHARA) |
| 13 | 19.289 | 2.28 | 1.92286 | 18.90 | S-NPH2(OHARA) |
| 14 | 44.523 | DC | | | |
| 15 | AS | 0.50 | | | (AS) |
| 16 | 0.000 | 1.00 | 1.51633 | 64.14 | (F) |
| 17 | 0.000 | 0.50 | | | |
| 18 | 42.515 | 7.46 | 1.49700 | 81.54 | S-FPL51(OHARA) |
| 19 | −53.161 | 1.86 | | | |
| 20 | 70.306 | 1.00 | 1.51633 | 64.14 | S-BSL7(OHARA) |
| 21 | 24.474 | 1.78 | | | |
| 22 | 33.671 | 10.23 | 1.49700 | 81.54 | S-FPL51(OHARA) |
| 23 | −21.582 | 1.20 | 1.70154 | 41.24 | S-BAH27(OHARA) |
| 24 | −398.141 | 0.50 | | | |
| 25 | 24.878 | 5.24 | 1.49700 | 81.54 | S-FPL51(OHARA) |
| 26 | 191.475 | 15.30 | | | |
| 27 | 49.193 | 1.20 | 1.48749 | 70.24 | S-FSL5(OHARA) |
| 28 | 15.235 | 6.53 | | | |
| 29 | 239.500 | 2.90 | 1.63930 | 44.87 | S-BAM12(OHARA) |
| 30 | −39.538 | 16.50 | | | |
| 31 | 0.000 | 3.50 | 1.51633 | 64.14 | FILTER(FG) |
| 32 | 0.000 | | | | |

In Embodiment 1, when zooming is carried out from the wide-angle end (WIDE) to the telephoto end (TELE) through the intermediate (mean) focal distance (MEAN), the total focal length f of the optical system, the F-number, the half-field angle ω, an interval (distance) DA between the first lens group G1a and the second lens group G2a, an interval (distance) DB between the second lens group G2a and the third lens group G3a, and an interval (distance) DC between the third lens group G3a and the aperture stop AS change as shown in the following

TABLE 2

| | Wide | Mean | Tele |
|---|---|---|---|
| f | 15.45 | 70.34 | 320.15 |
| F-NUMBER | 1.95 | 1.95 | 4.78 |
| ω | 18.80 | 3.87 | 0.83 |
| DA | 2.0096 | 56.3947 | 65.3916 |
| DB | 43.1608 | 2.5503 | 46.5448 |
| DC | 68.8671 | 55.0925 | 2.1011 |

A focal length of a diffraction lens surface (fdoe) is expressed by:

$$fdoe = -1/(2 \times C2)$$

where C2 is a coefficient of 2nd order in a phase function. In Embodiment 1, the coefficient C2 represents a phase relationship on the diffraction lens surface formed on the 2nd surface, i.e., the cemented surface 2 of the negative lens L11a and the positive lens L12a, and the coefficient C2 becomes as shown in the following Table 3. In Table 3, a coefficient of 4th order in the phase function (C4) is also shown.

TABLE 3

| COEFFICIENTS IN PHASE FUNCTION | | | |
|---|---|---|---|
| LENS SURFACE | λ | C2 | C4 |
| 2 | 587.6 | −1.73030E−05 | 2.55421E−09 |

As mentioned above, a structure of the diffraction grating is expressed:

$$\phi(h) = (2\pi/\lambda d)(C2 \cdot h^2 + C4 \cdot h^4)$$

where λd represents a reference wavelength (d-line), h represents a height from the optical axis, and φ(h) represents a phase.

In Embodiment 1, values fulfilling the above conditions (1) to (9) are shown in the following Tables 4 and 5

Specifically, Table 4 shows the values corresponding to the conditions (1) and (5) to (9), and Table 5 shows the values corresponding to the conditions (2) to (4).

TABLE 4

| CONDITIONS | | |
|---|---|---|
| (R411 − R422)/(R411 + R422) | 0.27 | (1) |
| Rcom/(N44 − N43)/f41 | −2.16 | (5) |
| f41/f42 | −0.67 | (6) |
| f43/f44 | −0.87 | (7) |
| f45/f44 | −1.75 | (8) |
| f1doe/f1 | 230.59 | (9) |

TABLE 5

| | | | |
|---|---|---|---|
| S-FPL53 | Nd | 1.43875 | (2) |
| | vd | 94.94 | (3) |
| | Pg, F − (−0.001802 × vd + 0.6483) | 0.057 | (4) |
| S-FPL51 | Nd | 1.49700 | (2) |
| | vd | 81.54 | (3) |
| | Pg, F − (−0.001802 × vd + 0.6483) | 0.036 | (4) |
| S-FPM2 | Nd | 1.59522 | (2) |
| | vd | 67.74 | (3) |
| | Pg, F − (−0.001802 × vd + 0.6483) | 0.018 | (4) |
| S-FPM3 | Nd | 1.53775 | (2) |
| | vd | 74.70 | (3) |
| | Pg, F − (−0.001802 × vd + 0.6483) | 0.026 | (4) |

Further, a partial dispersion ratio $P_{g,F}$ corresponding to the condition (4) for each optical glass is shown in the following Table 6.

TABLE 6

| PARTIAL DISPERSION RATIOS OF THE POSITIVE LENS: $P_{g,F}$ | |
|---|---|
| S-FPL51 | 0.5375 |
| S-FPL53 | 0.534 |
| S-FPM2 | 0.5442 |
| S-FPM3 | 0.5392 |

FIGS. 2, 3, and 4 respectively show spherical aberration graphs, astigmatism aberration graphs, distortion aberration graphs, and coma aberration graphs at the wide-angle end, at the intermediate focal length, and at the telephoto end of the zoom lens unit according to Embodiment 1. In the drawings, dashed lines in the spherical aberration graphs represent a sine condition. Also, solid lines in the astigmatism aberration graphs represent sagittal aberrations and dashed lines in the astigmatism aberration graphs represent meridional aberrations. Note that aberration graphs for other Embodiments are drawn in the same manner.

As clearly shown in FIGS. 2 to 4, the aberrations are corrected sufficiently in the zoom lens unit according to Embodiment 1. Also, the zoom lens unit according to Embodiment 1 has the resolving power compatible with the image pickup devices of 1,000,000 to 5,000,000 pixels. Therefore, it is possible to achieve high imaging performance and compactness by configuring a zoom lens unit in accordance with Embodiment 1.

Embodiment 2

Figure 5A:
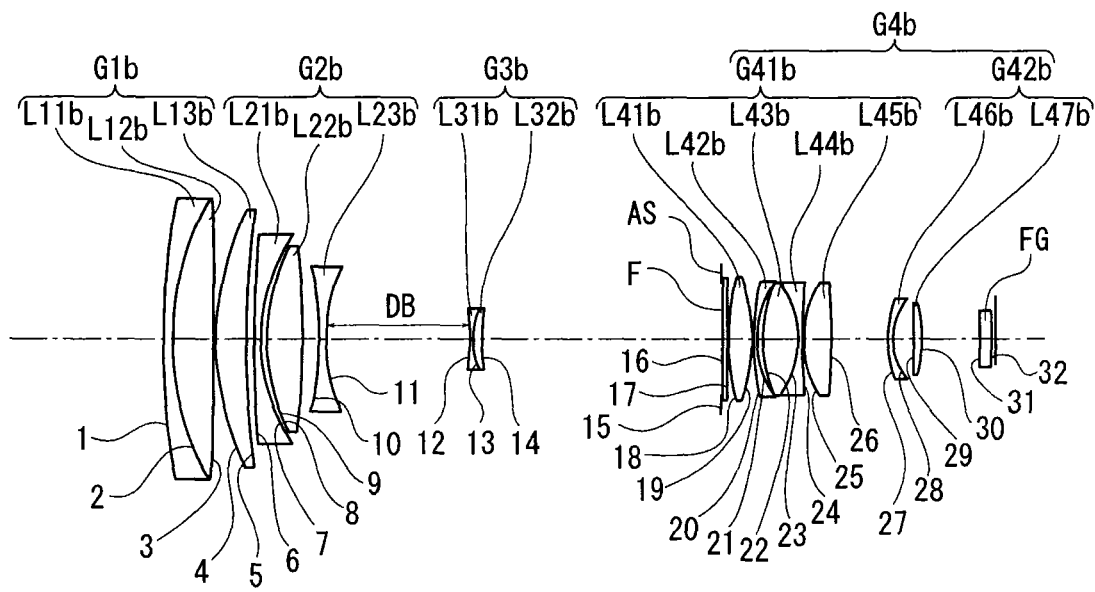
FIG. 5A is a cross-section view illustrating an arrangement of optical system (lenses) at a wide-angle end of a zoom lens unit according to Embodiment 2.
Figure 5B:
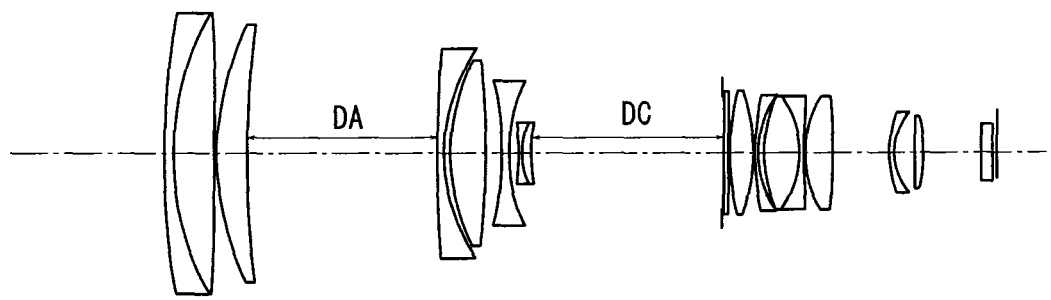
FIG. 5B is a cross-section view illustrating an arrangement of optical system (lenses) at an intermediate focal distance of the zoom lens unit according to Embodiment 2.
Figure 5C:
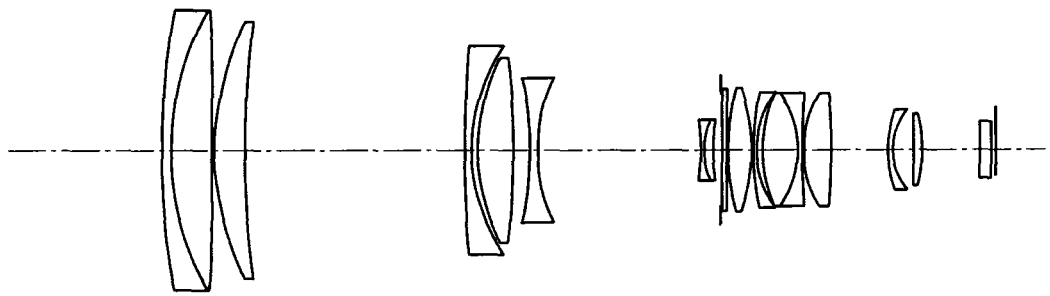
FIG. 5C is a cross-section view illustrating an arrangement of optical system (lenses) at a telephoto end of the zoom lens unit according to Embodiment 2.

FIGS. 5A to 5C show overall arrangements of the zoom lens unit and a zooming trajectory of each lens group from a short focal length end (wide-angle end) to a long focal length end (telephoto end) through a predetermined intermediate focal length, in accordance with the second Embodiment. To be specific, FIG. 5A shows an arrangement of the lenses at the wide-angle end, FIG. 5B shows an arrangement of the lenses at the intermediate focal length, and FIG. 5C shows an arrangement of the lenses at the telephoto end.

The zoom lens unit shown in FIGS. 5A to 5C includes, in order from an object side (the left side in FIGS. 5A-5C) to an image side (the right side therein), a first lens group G1b with positive refractive power, a second lens group G2b with negative refractive power, a third lens group G3b with negative refractive power, and a fourth lens group G4b with positive refractive power.

The fourth lens group G4b includes a fourth front lens group G41b, which is disposed on the object side than a position where a gap between the lenses in the fourth lens group G4a is the widest (in other words, the forth front lens group G41a is disposed between an aperture stop (AS) and the widest gap), and a fourth latter lens group G42b.

Each of the first to fourth lens groups G1b to G4b of the zoom lens unit is supported by a supporting member (not shown). For zooming, etc., the second and third lens groups each move integrally, and the aperture stop AS is integrally installed with the fourth lens group G4b. In FIGS. 5A to 5C, surface numbers of the optical materials (lenses) are also shown for convenience.

When changing the magnification rate from the wide-angle end to the telephoto end; the second lens group G2b moves toward the image side and the third lens group G3b moves toward the image side or the object side on the optical axis, while the first and fourth lens groups G1b, G4b are fixed. That is to say, an interval between the first lens group G1b and second lens group G2b increases, and an interval between the second lens group G2b and the third lens group G3b changes (increases or decreases) accordingly.

In Embodiment 2 shown in FIGS. 5A to 5C, the first lens group G1b of the zoom lens unit includes, in order from the object side, a negative meniscus lens L11b having a concave surface on the image plane side, a positive biconvex lens L12b having a smaller convex surface on the object side (i.e., the curvature radius on the object side of the biconvex lens L12b is smaller than the curvature radius on the image plan side thereof), and a positive meniscus lens L13b having a convex surface on the object side.

A laminated type diffraction optical element is adhered to a lens surface of the first lens group G1b, specifically on the cemented surface 2 of the negative lens L11b and the positive lens L12b.

Further, the negative lens L11b and the positive lens L12b of the first lens group G1b are closely contacted and bonded to each other to form a cemented lens.

The second lens group G2b of the zoom lens unit according to Embodiment 2 includes, in order from the object side, a negative meniscus lens L21b having a concave surface on the image plane side, a positive biconvex lens L22b having a smaller convex surface on the object side (i.e., the curvature radius on the object side of the positive biconvex lens L22b is smaller than the curvature radius on the image plane side thereof), and a negative biconcave lens L23b having a smaller concave surface on the image plane side (i.e., the absolute value of the curvature radius on the image plane side of the negative biconcave lens L23b is smaller than the absolute value of the curvature radius on the object side thereof.

The third lens group G3b of the zoom lens unit according to Embodiment 2 includes, in order from the object side, a negative biconcave lens L31b having a smaller concave surface on the object side (i.e., the absolute value of the curvature radius on the object side of the positive biconcave lens L31b is smaller than the absolute value of the curvature radius on the object side thereof), and a positive meniscus lens L32b having a convex surface on the object side.

The negative lens L31 and the positive lens L32b of the third lens group G3 are closely contacted and bonded to each other to form a cemented lens.

The aperture stop AS is interposed between the third lens group G3b and the fourth lens group G4b, and filters F such as an ND filter composed of a parallel plate are also interposed therebetween adjacently to the aperture stop AS. The aperture stop AS and the filters F are integrally supported by the support member together with the fourth lens group G4b.

The fourth front lens group G41b, which is disposed on the object side than a position where a gap between the lenses in the fourth lens group G4b is the widest (in other words, the forth front lens group G41b, which is disposed between the aperture stop (AS) and the widest gap), includes, in order from the object side, a positive biconvex lens L41b having a smaller convex surface on the image plane side (i.e., the curvature radius on the image plane side of the positive biconvex lens L41b is smaller than the curvature radius on the object side thereof), a negative meniscus lens L42b having a concave surface on the image plane side, a positive biconvex lens L43b having a smaller convex surface on the image plane side (i.e., the curvature radius on the image plane side of the positive biconvex lens L43b is smaller than the curvature radius on the object side thereof), a negative biconcave lens L44b having a smaller concave surface on the object side (i.e., the absolute value of the curvature radius on the object side is smaller than the absolute value of the curvature radius on the image plane side), a positive biconvex lens L45b having a smaller convex surface on the object side (i.e., the curvature radius on the object side of the positive biconvex lens L45b is smaller than the curvature side on the image plane side thereof).

The positive lens L43b and the negative lens L44b of the fourth front lens group G41b are closely contacted and bonded to each other to form a cemented lens.

Further, the fourth latter lens group G42b, which is disposed between the widest gap and the image plane, includes, in order from the object side, a negative meniscus lens L46b having a concave surface on the image plane side and a positive meniscus lens L47b having a convex surface on the image plane side.

Optical filters such as an optical low-pass filter and an optical infrared cut-off filter, and/or a cover glass (sealing glass) of a photo acceptance element such as a CMOS imaging sensor and a CCD imaging sensor are disposed in the fourth latter lens group G42b. In the drawings, a filter FG is shown as an equivalent transparent parallel flat plate.

It is preferable to adjust the focusing by the first lens group G1b since the position of the first lens group G1b used for the focusing adjustments does not change for the whole zooming range even if the first lens group G1b is used to adjust the focusing.

In Embodiment 2, the total focal length f of the optical system changes from 15.44-70.28-319.93 mm the F-number F changes from 1.93-1.93-4.77, and a half-field angle ωchanges from 18.79-3.87-0.83 degrees respectively when zooming from the wide-angle end to the telephoto end through the intermediate focal length. Optical characteristics of each optical element are shown in the following table 7.

TABLE 7

| LENS SURFACE | R | D | N | ν | GLASS |
|---|---|---|---|---|---|
| 1 | 191.553 | 2.80 | 1.74950 | 35.33 | S-NBH51 (OHARA) |
| 2* | 71.558 | 11.47 | 1.60300 | 65.44 | S-PHM53 (OHARA) |
| 3 | −1405.353 | 0.50 | | | |
| 4 | 66.090 | 9.36 | 1.49700 | 81.54 | S-FPL51 (OHARA) |
| 5 | 288.267 | DA | | | |
| 6 | 477.848 | 2.00 | 1.74950 | 35.28 | S-LAM7 (OHARA) |
| 7 | 45.678 | 1.54 | | | |
| 8 | 48.290 | 10.33 | 1.75520 | 27.51 | S-TIH4 (OHARA) |
| 9 | −189.709 | 4.71 | | | |
| 10 | −81.220 | 2.00 | 1.71300 | 53.87 | S-LAL8 (OHARA) |
| 11 | 43.380 | DB | | | |
| 12 | −57.677 | 1.20 | 1.74950 | 35.28 | S-LAM7 (OHARA) |
| 13 | 19.160 | 2.29 | 1.92286 | 18.90 | S-NPH2 (OHARA) |
| 14 | 44.088 | DC | | | |
| 15 | AS | 0.50 | | | (AS) |
| 16 | 0.000 | 1.00 | 1.51633 | 64.14 | (F) |
| 17 | 0.000 | 0.50 | | | |
| 18 | 58.007 | 6.81 | 1.53775 | 74.70 | S-FPM3 (OHARA) |
| 19 | −46.864 | 0.50 | | | |
| 20 | 58.304 | 1.00 | 1.48749 | 70.24 | S-FSL5 (OHARA) |
| 21 | 24.750 | 1.65 | | | |
| 22 | 32.583 | 10.07 | 1.49700 | 81.54 | S-FPL51 (OHARA) |
| 23 | −22.980 | 1.20 | 1.72000 | 41.98 | S-LAM58 (OHARA) |
| 24 | 156.714 | 0.50 | | | |
| 25 | 27.394 | 7.63 | 1.49700 | 81.54 | S-FPL51 (OHARA) |
| 26 | −1016.277 | 16.40 | | | |
| 27 | 26.330 | 1.42 | 1.48749 | 70.24 | S-FSL5 (OHARA) |
| 28 | 14.452 | 6.04 | | | |
| 29 | −288.651 | 2.77 | 1.63930 | 44.87 | S-BAM12 (OHARA) |
| 30 | −34.750 | 16.50 | | | |
| 31 | 0.000 | 3.50 | 1.51633 | 64.14 | FILTER(FG) |
| 32 | 0.000 | | | | |

In Embodiment 2, when zooming from the wide-angle end (WIDE) to the telephoto and (TELE) through the intermediate focal length (MEAN), the total focal length of the optical system, the F-number, the half-field angle ω, an interval (distance) DA between the first lens group G1b and the second lens group G2b, an interval (distance) DB between the second lens group G2b and the third lens group G3b, and an interval (distance) DC between the third lens group G3b and the aperture stop AS changes as shown in the following Table 8.

TABLE 8

| | Wide | Mean | Tele |
|---|---|---|---|
| f | 15.44 | 70.28 | 319.93 |
| F-NUMBER | 1.93 | 1.93 | 4.77 |
| ω | 18.79 | 3.87 | 0.83 |
| DA | 2.0873 | 55.0737 | 63.5878 |
| DB | 41.5907 | 2.5651 | 46.9217 |
| DC | 68.9309 | 54.9700 | 2.0985 |

A focal length of a diffraction lens surface (fdoe) is expressed by:

$$fdoe = -1(2 \times C2)$$

where C2 is a coefficient of 2nd order in a phase function. In Embodiment 2, the coefficient C2 represents a phase relationship on the diffraction lens surface formed on the 2nd surface, i.e., the cemented surface 2 of the negative lens L11 and the positive lens L12, and the coefficient C2 becomes as shown in the following Table 9. In Table 9, a coefficient of 4th order in the phase function (C4) is also shown.

TABLE 9

COEFFICIENTS IN PHASE FUNCTION

| LENS SURFACE | λ | C2 | C4 |
|---|---|---|---|
| 2 | 587.6 | −1.76908E−05 | 2.61399E−09 |

As mentioned above, a structure of the diffraction grating is expressed by:

$$\phi(h)=(2\pi/\lambda d)(C2 \cdot h^2 + C4 \cdot h^4)$$

where λd represents a reference wavelength (d-line), h represents a height from the optical axis, and ϕ(h) represents a phase.

In Embodiment 2, values fulfilling the conditions (1) to (9) are shown in the following Tables 10 and 11.

Specifically, Table 10 shows the values corresponding to the conditions (1) and (5) to (9), and Table 11 shows the values corresponding to the conditions (2) to (4).

TABLE 10

CONDITIONS

| (R411 − R422)/(R411 + R422) | 0.40 | (1) |
|---|---|---|
| Rcom/(N44 − N43)/f41 | −2.09 | (5) |
| f41/f42 | −0.55 | (6) |
| f43/f44 | −1.04 | (7) |
| f45/f44 | −1.94 | (8) |
| f1doe/f1 | 229.27 | (9) |

TABLE 11

| S-FPL53 | Nd | 1.43875 | (2) |
|---|---|---|---|
| | vd | 94.94 | (3) |
| | Pg, F − (−0.001802 × vd + 0.6483) | 0.057 | (4) |
| S-FPL51 | Nd | 1.49700 | (2) |
| | vd | 81.54 | (3) |
| | Pg, F − (−0.001802 × vd + 0.6483) | 0.036 | (4) |
| S-FPM2 | Nd | 1.59522 | (2) |
| | vd | 67.74 | (3) |
| | Pg, F − (−0.001802 × vd + 0.6483) | 0.018 | (4) |
| S-FPM3 | Nd | 1.53775 | (2) |
| | vd | 74.70 | (3) |
| | Pg, F − (−0.001802 × vd + 0.6483) | 0.026 | (4) |

Further a partial dispersion ratio $P_{g,F}$ corresponding to the condition (4) for each optical glass is shown in the following Table 12.

TABLE 12

PARTIAL DISPERSION RATIOS OF THE POSITIVE LENS: $P_{g,F}$

| S-FPL51 | 0.5375 |
|---|---|
| S-FPL53 | 0.534 |
| S-FPM2 | 0.5442 |
| S-FPM3 | 0.5392 |

FIGS. 6, 7, and 8 respectively show spherical aberration graphs, astigmatism aberration graphs, distortion aberration graphs, and coma aberration graphs at the wide-angle end, the intermediate focal length, and the telephoto end of the zoom lens unit according to Embodiment 2.

As clearly shown in FIGS. 6 to 8, the aberrations are corrected sufficiently in the zoom lens unit according to Embodiment 2. Also, the zoom lens unit according to Embodiment 2 has the resolving power compatible with the image pickup devices of 1,000,000 to 5,000,000 pixels. Therefore, it is possible to achieve high imaging performance and compactness by configuring a zoom lens unit in accordance with Embodiment 2.

Embodiment 3

Figure 9A:
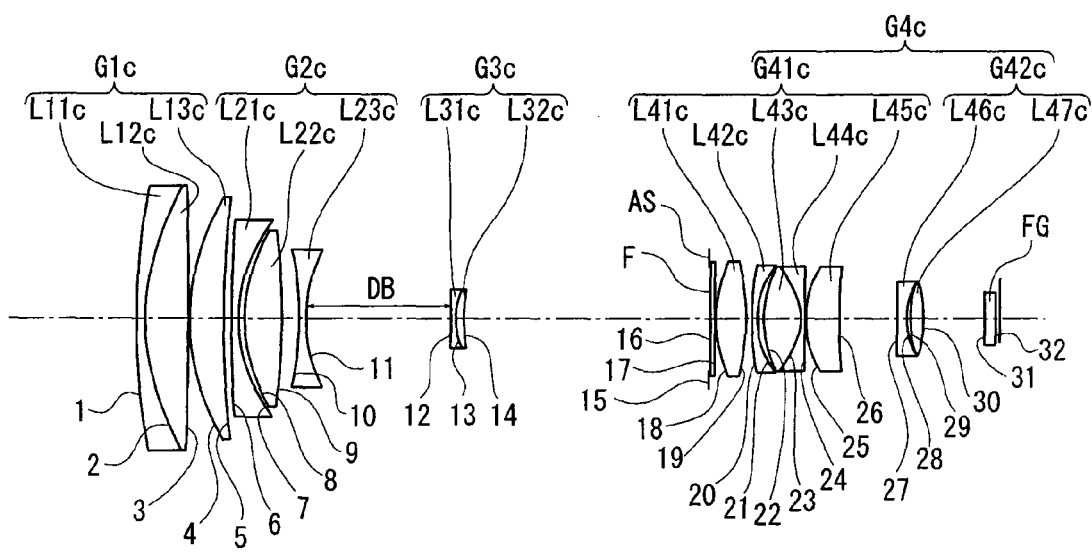
FIG. 9A is a cross-section view illustrating an arrangement of optical system (lenses) at a wide-angle end of a zoom lens unit according to Embodiment 3.
Figure 9B:
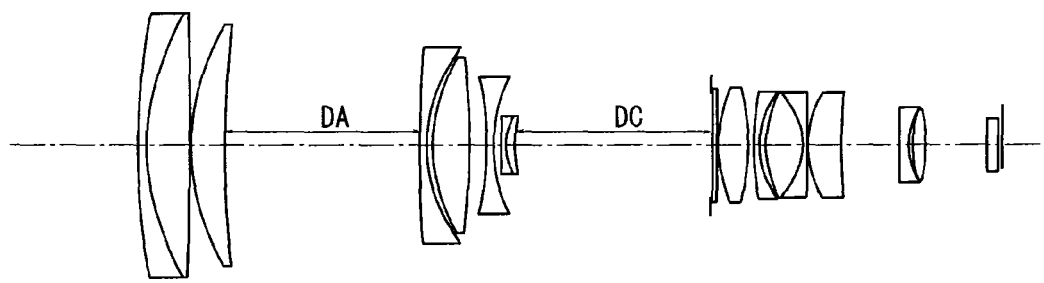
FIG. 9B is a cross-section view illustrating an arrangement of optical system (lenses) at an intermediate focal distance of the zoom lens unit according to Embodiment 3.
Figure 9C:
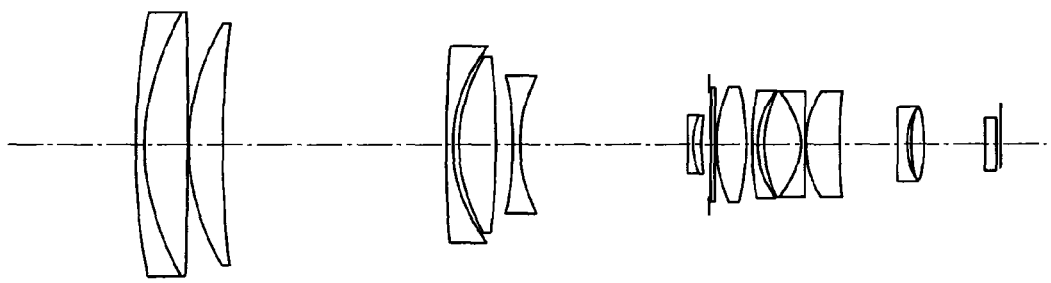
FIG. 9C is a cross-section view illustrating an arrangement of optical system (lenses) at a telephoto end of the zoom lens unit according to Embodiment 3.

FIGS. 9A to 9C show overall arrangements of the zoom lens unit and a zooming trajectory of each lens group from a short focal length end (wide-angle end) to a long focal length end (telephoto end) through a predetermined intermediate focal length, in accordance with the third Embodiment. To be specific, FIG. 9A shows an arrangement of the lenses at the wide-angle end, FIG. 9B shows an arrangement of the lenses at the intermediate focal length, and FIG. 9C shows an arrangement of the lenses at the telephoto end.

The zoom lens unit shown in FIGS. 9A to 9C includes, in order from an object side (the left side in FIGS. 9A to 9C) to an image side (the right side therein), a first lens group G1c with positive refractive power, a second lens group G2c with a negative refracting power, a third lens group G3c with a negative refracting power, and a fourth lens group G4c with a positive refracting power.

The fourth lens group G4c includes a fourth front lens group G41c, which is disposed on the object side than a position where a gap between the lenses in the fourth lens group G4c is the widest (in other words, the forth front lens group G41c is disposed between an aperture stop (AS) and the widest gap), and a fourth latter lens group G42c.

Each of the first to fourth lens groups G1c to G4c of the zoom lens unit is supported by a supporting member (not shown). For zooming, etc., the second and third lens groups G2c, G3c each move integrally, and the aperture stop AS is integrally installed with the fourth lens group G4c. In FIGS. 9A to 9C, surface numbers of the optical materials (lenses, etc.) are also shown for convenience.

When changing the magnification ratio from the wide-angle end to the telephoto end; the second lens group G2c moves toward the image side and the third lens group G3c moves toward the image side or the object side on the optical axis, while the first and fourth lens groups G1c, G4c are fixed. That is to say, an interval between the first lens group G1c and the second lens group G2c increases, and an interval between the second lens group G2c and the third lens group G3c changes (increases or decreases) accordingly.

In Embodiment 3 shown in FIGS. 9A to 9C, the first lens group G1c of the zoom lens unit includes, in order from the object side, a negative meniscus lens L11c having a concave surface on the image plane side, a positive biconvex lens L12c having a smaller convex surface on the object side (i.e., the curvature radius on the object side of the positive biconvex lens L12c is smaller than the curvature radius on the image plane side thereof), and a positive meniscus lens L13c having a convex surface on the object side.

A laminated type diffraction optical element is adhered to a lens surface of the first lens group G1c, specifically on the cemented surface 2 of the negative lens L11c and the positive lens L12c.

Further, the negative lens L11c and the positive lens L12c of the first lens group G1c are closely contacted and bonded to each other to form a cemented lens.

The second lens group G2c of the zoom lens unit according to Embodiment 3 includes, in order from the object side, a negative meniscus lens L21c having a concave surface on the image plane side, a positive biconvex lens L22c having a smaller convex surface on the object side (i.e., the curvature radius on the object side of the positive biconvex lens L22c is smaller than the curvature radius on the image plane side thereof), and a negative biconcave lens L23c having a smaller concave surface on the image plane side (i.e., the absolute value of the concave surface on the image plane side of the negative biconcave lens L23c is smaller than the absolute value of the concave surface on the object side thereof).

The third lens group G3c of the zoom lens unit according to Embodiment 3 includes, in order from the object side, a negative biconcave lens L31c having a smaller concave surface on the image plane side (i.e., the absolute value of the curvature radius on the image plane side of the negative biconcave lens L31c is smaller than the absolute value of the curvature radius of the concave surface on the object side thereof), and a positive meniscus lens L32c having a convex surface on the object side.

The negative lens L31c and the positive lens L32c of the third lens group G3c are closely contacted and bonded to each other to form a cemented lens.

The aperture stop AS is interposed between the third lens group G3c and the fourth lens group G4c, and filters F such as an ND filter composed of parallel plate are also interposed therebetween adjacently to the aperture stop AS. The aperture stop AS and the filters F are integrally supported by the supporting member together with the fourth lens group G4c.

The fourth front lens group G41c, which is disposed on the object side than a position where a gap between the lenses in the fourth lens group G4c is the widest (in other words, the forth front lens group G41c, which is disposed between the aperture stop (AS) and the widest gap), includes, in order from the object side, a positive biconvex lens L41c having a smaller convex surface on the object side (i.e., the curvature radius on the object side of the positive biconvex lens L41c is smaller than the curvature radius on the image plane side thereof), a negative meniscus lens L42c having a concave surface on the image plane side, a positive biconvex lens L43c having a smaller convex surface on the image plane side (i.e., the curvature radius on the image plane side of the positive biconvex lens L43c is smaller than the curvature radius on the object side thereof), a negative biconcave lens L44c having a smaller concave surface on the object side (i.e., the absolute value of the curvature radius on the object side of the negative biconcave lens L44c is smaller than the absolute value of the curvature radius on the image plane side thereof), and a positive meniscus lens L45c having a convex surface on the object side.

The positive lens L43c and the negative lens L44c of the fourth front lens group G41c are closely contacted and bonded to each other to form a cemented lens.

Further, the fourth latter lens group G42c, which is disposed between the widest gap and the image plane, includes, in order from the object side, a negative meniscus lens L46c having a concave surface on the image plane side, and a positive biconvex lens L47c having a smaller convex surface on the object side (i.e., the curvature radius on the object side of the positive biconvex lens L47c is smaller than the curvature radius on the image plane side thereof).

Optical filters such as an optical low-pass filter and an optical infrared cut-off filter, and/or a cover glass (sealing glass) of a photo acceptance element such as a CMOS imaging sensor and a CCD imaging sensor are disposed in the fourth latter lens group G42c. In the drawings, a filter FG is shown as an equivalent transparent parallel flat plate.

It is preferable to adjust the focusing by the first lens group G1c since the position of the first lens group G1c used for the focusing adjustments does not change for the whole zooming range even if the first lens group G1c is used to adjust the focusing.

In Embodiment 3, the total focal length f of the optical system changes from 15.44-70.28-319.95 mm the F-number F changes from 1.93-1.93-4.76, and a half-field angle ωchanges from 18.79-3.88-0.83 degrees respectively when zooming from the wide-angle end to the telephoto end through the intermediate focal length. Optical characteristics of each optical element are shown in the following Table 13.

TABLE 13

| LENS SURFACE | R | D | N | ν | GLASS |
|---|---|---|---|---|---|
| 1 | 190.656 | 2.80 | 1.74950 | 35.33 | S-NBH51(OHARA) |
| 2* | 70.674 | 11.66 | 1.60300 | 65.44 | S-PHM53(OHARA) |
| 3 | −1181.300 | 0.50 | | | |
| 4 | 64.781 | 9.46 | 1.49700 | 81.54 | S-FPL51(OHARA) |
| 5 | 274.598 | DA | | | |
| 6 | 432.204 | 2.00 | 1.74950 | 35.28 | S-LAM7(OHARA) |
| 7 | 43.713 | 1.63 | | | |
| 8 | 46.673 | 10.51 | 1.75520 | 27.51 | S-TIH4(OHARA) |
| 9 | −189.709 | 4.70 | | | |
| 10 | −81.220 | 2.00 | 1.71300 | 53.87 | S-LAL8(OHARA) |
| 11 | 42.703 | DB | | | |
| 12 | −56.134 | 1.20 | 1.74950 | 35.28 | S-LAM7(OHARA) |
| 13 | 18.685 | 2.30 | 1.92286 | 18.90 | S-NPH2(OHARA) |
| 14 | 43.020 | DC | | | |
| 15 | AS | 0.50 | | | (AS) |
| 16 | 0.000 | 1.00 | 1.51633 | 64.14 | (F) |
| 17 | 0.000 | 0.50 | | | |
| 18 | 37.117 | 8.51 | 1.53775 | 74.70 | S-FPM3(OHARA) |
| 19 | −61.361 | 1.52 | | | |
| 20 | 102.892 | 1.44 | 1.48749 | 70.24 | S-FSL5(OHARA) |
| 21 | 23.445 | 1.87 | | | |
| 22 | 33.192 | 9.99 | 1.49700 | 81.54 | S-FPL51(OHARA) |
| 23 | −20.761 | 1.20 | 1.72342 | 37.95 | S-BAH28(OHARA) |
| 24 | 5218.092 | 0.50 | | | |
| 25 | 28.717 | 9.23 | 1.59522 | 67.73 | S-FPM2(OHARA) |
| 26 | 284.001 | 16.15 | | | |
| 27 | 1367.292 | 2.21 | 1.48749 | 70.24 | S-FSL5(OHARA) |
| 28 | 17.233 | 1.43 | | | |
| 29 | 35.160 | 3.61 | 1.54814 | 45.78 | S-TIL1(OHARA) |
| 30 | −45.107 | 16.50 | | | |
| 31 | 0.000 | 3.50 | 1.51633 | 64.14 | FILTER(FG) |
| 32 | 0.000 | | | | |

In Embodiment 3, when zooming from the wide-angle end (WIDE) to the telephoto and (TELE) through the intermediate focal length (MEAN), the total focal length of the optical system, the F-number, the half-field angle ω, a variable interval (distance) DA between the first lens group G1c and the second lens group G2c, a variable interval (distance) DB between the second lens group G2c and the third lens group G3c, and an variable interval (distance) DC between the third lens group G3c and the aperture stop AS changes as shown in the following Table 14.

TABLE 14

| | Wide | Mean | Tele |
|---|---|---|---|
| f | 15.44 | 70.28 | 319.95 |
| F-NUMBER | 1.93 | 1.93 | 4.76 |
| ω | 18.79 | 3.88 | 0.83 |
| DA | 2.0790 | 53.7893 | 61.8311 |
| DB | 40.3768 | 2.5739 | 46.4448 |
| DC | 67.9235 | 54.0161 | 2.1034 |

A focal length of a diffraction lens surface (fdoe) is expressed by:

$$fdoe = -1/(2 \times C2)$$

where C2 is a coefficient of 2nd order in a phase function. In Embodiment 3, the coefficient C2 represents a phase relationship on the diffraction lens surface formed on the 2nd surface, i.e., the cemented surface 2 of the negative lens L11 and the positive lens L12, and the coefficient C2 becomes as shown in the following Table 15. In Table 15, a coefficient of 4th order in the phase function (C4) is also shown.

TABLE 15

COEFFICIENTS IN PHASE FUNCTION

| LENS SURFACE | λ | C2 | C4 |
|---|---|---|---|
| 2 | 587.6 | −1.84238E−05 | 2.87268E−09 |

As mentioned above, a structure of the diffraction grating is expressed by:

$$\phi(h) = (2\pi/\lambda d)(C2 \cdot h^2 + C4 \cdot h^4)$$

where λd represents a reference wavelength (d-line), h represents a height from the optical axis, and φ(h) represents a phase.

In Embodiment 3, values fulfilling the conditions (1) to (9) are shown in the following Tables 16 and 17.

Specifically, Table 16 shows the values corresponding to the conditions (1) and (5) to (9), and Table 17 shows the values corresponding to the conditions (2) to (4).

TABLE 16

CONDITIONS

| (R411 − R422)/(R411 + R422) | 0.23 | (1) |
|---|---|---|
| Rcom/(N44 − N43)/f41 | −2.07 | (5) |
| f41/f42 | −0.71 | (6) |
| f43/f44 | −0.96 | (7) |
| f45/f44 | −1.85 | (8) |
| f1doe/f1 | 224.12 | (9) |

TABLE 17

| S-FPL53 | Nd | 1.43875 | (2) |
|---|---|---|---|
| | vd | 94.94 | (3) |
| | Pg, F − (−0.001802 × vd + 0.6483) | 0.057 | (4) |
| S-FPL51 | Nd | 1.49700 | (2) |
| | vd | 81.54 | (3) |
| | Pg, F − (−0.001802 × vd + 0.6483) | 0.036 | (4) |
| S-FPM2 | Nd | 1.59522 | (2) |
| | vd | 67.74 | (3) |
| | Pg, F − (−0.001802 × vd + 0.6483) | 0.018 | (4) |
| S-FPM3 | Nd | 1.53775 | (2) |
| | vd | 74.70 | (3) |
| | Pg, F − (−0.001802 × vd + 0.6483) | 0.026 | (4) |

Further a partial dispersion ratio $P_{g,F}$ corresponding to the condition (4) for each optical glass is shown in the following Table 18.

TABLE 18

PARTIAL DISPERSION RATIOS OF THE POSITIVE LENS: $P_{gF}$

| S-FPL51 | 0.5375 |
|---|---|
| S-FPL53 | 0.534 |
| S-FPM2 | 0.5442 |
| S-FPM3 | 0.5392 |

Figure 12:
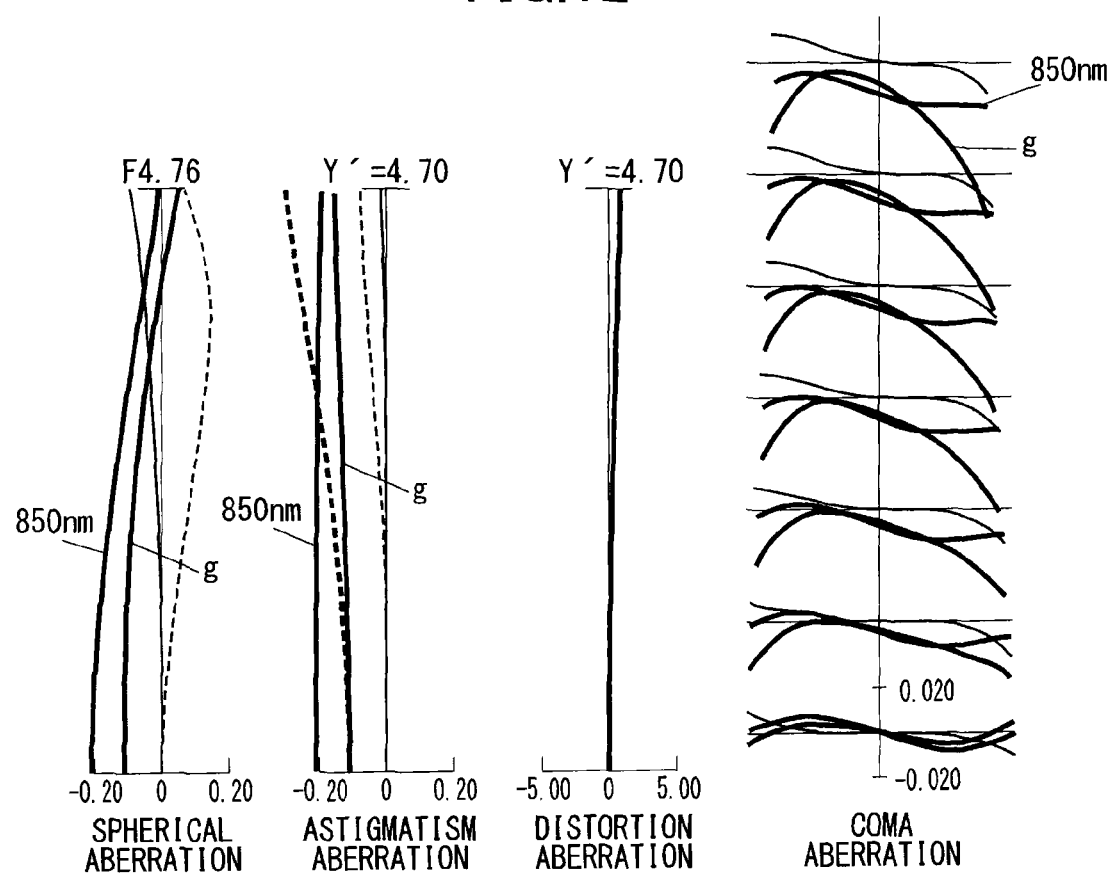
FIG. 12 shows graphs drawing curves of spherical aberration, astigmatism aberration, distortion aberration, and coma aberration at the telephoto end of the zoom lens unit according to Embodiment 3 shown in FIG. 9C.

FIGS. 10, 11, and 12 respectively show spherical aberration graphs, astigmatism aberration graphs, distortion aberration graphs, and coma aberration graphs at the wide-angle end, the intermediate focal length, and the telephoto end of the zoom lens unit according to Embodiment 3.

As clearly shown in FIGS. 10 to 12, the aberrations are corrected sufficiently in the zoom lens unit according to Embodiment 3. Also, the zoom lens unit according to Embodiment 3 has the resolving power compatible with the image pickup devices of 1,000,000 to 5,000,000 pixels. Therefore, it is possible to achieve high imaging performance and compactness by configuring a zoom lens unit in accordance with Embodiment 3.

Embodiment 4

Figure 13A:
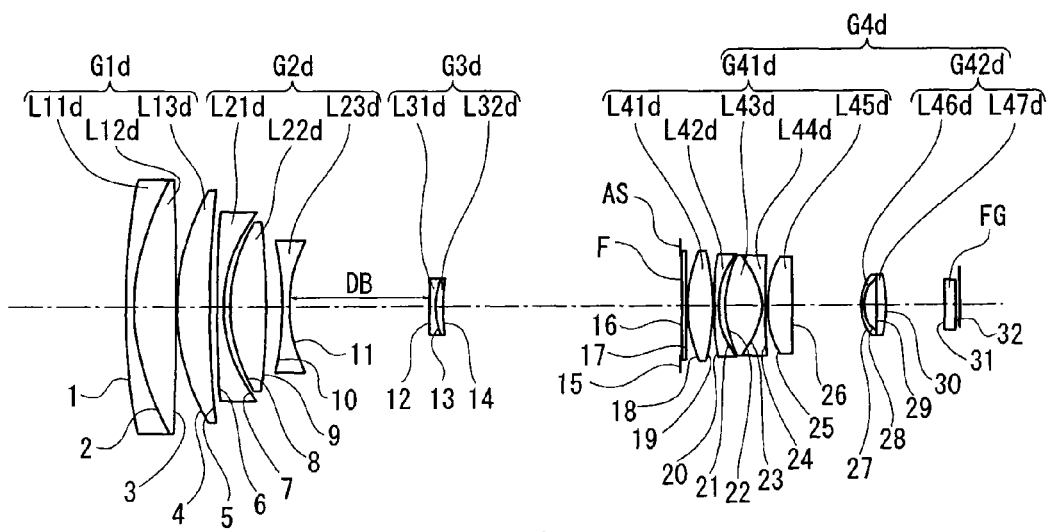
FIG. 13A is a cross-section view illustrating an arrangement of optical system (lenses) at a wide-angle end of a zoom lens unit according to Embodiment 4.
Figure 13B:
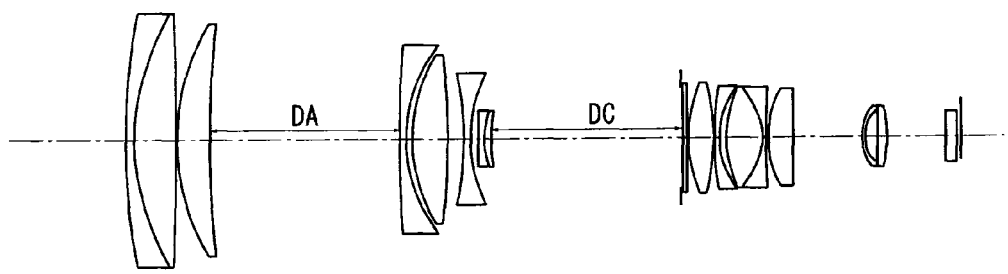
FIG. 13B is a cross-section view illustrating an arrangement of optical system (lenses) at an intermediate focal distance of the zoom lens unit according to Embodiment 4.
Figure 13C:
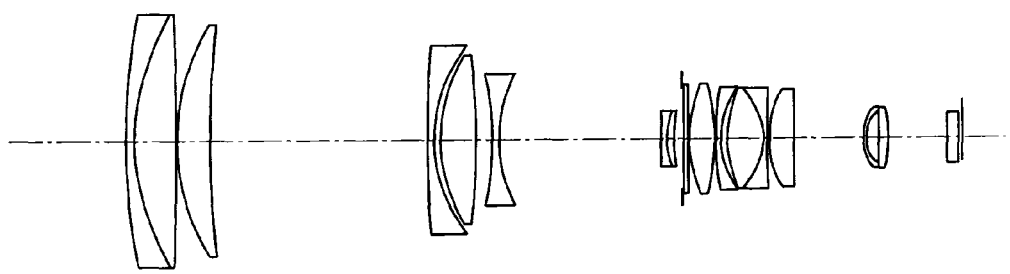
FIG. 13C is a cross-section view illustrating an arrangement of optical system (lenses) at a telephoto end of the zoom lens unit according to Embodiment 4.

FIGS. 13A to 13C show overall arrangements of the zoom lens unit and a zooming trajectory of each lens group from a short focal length end (wide-angle end) to a long focal length end (telephoto end) through a predetermined intermediate focal length, in accordance with the fourth Embodiment. To be specific, FIG. 13A shows an arrangement of the lenses at the wide-angle end, FIG. 13B shows an arrangement of the lenses at the intermediate focal length, and FIG. 13C shows an arrangement of the lenses at the telephoto end.

The zoom lens unit shown in FIGS. 13A to 13C includes, in order from an object side (the left side in FIGS. 13A to 13C) to an image side (the right side therein), a first lens group G1d with positive refractive power, a second lens group G2d with a negative refracting power, a third lens group G3d with a negative refracting power, and a fourth lens group G4d with a positive refracting power.

The fourth lens group G4d includes a fourth front lens group G41d, which is disposed on the object side than a position where a gap between the lenses in the fourth lens group G4a is the widest (in other words, the forth front lens group G41a is disposed between an aperture stop (AS) and the widest gap), and a fourth latter lens group G42d.

Each of the first to fourth lens groups G1d to G4d of the zoom lens unit is supported by a supporting member (not shown). For zooming, etc., the second and third lens groups G2d, G3d each move integrally, and the aperture stop AS is integrally installed with the fourth lens group G4d. In FIGS. 13A to 13C, surface numbers of the optical materials (lenses, etc.) are also shown for convenience.

When changing the magnification ratio from the wide-angle end to the telephoto end; the second lens group G2d moves toward the image side and the third lens group G3d moves toward the image side or the object side on the optical axis, while the first and fourth lens groups G1d, G4d are fixed. That is to say, an interval between the first lens group G1d and the second lens group G2d increases, and an interval between the second lens group G2d and the third lens group G3d changes (increases or decreases) accordingly.

In Embodiment 4 shown in FIGS. 13A to 13C, the first lens group G1d of the zoom lens unit includes, in order from the object side, a negative meniscus lens L11d having a concave surface on the image plane side, a positive biconvex lens L12d having a smaller convex surface on the object side (i.e., the curvature radius on the object side of the positive biconvex lens L12d is smaller than the curvature radius on the image plane side thereof), and a positive meniscus lens L13d having a convex surface on the object side.

A laminated type diffraction optical element is adhered to a lens surface of the first lens group G1d, specifically on the cemented surface 2 of the negative lens L11d and the positive lens L12d.

Further, the negative lens L11d and the positive lens L12d of the first lens group G1d are closely contacted and bonded to each other to form a cemented lens.

The second lens group G2d of the zoom lens unit according to Embodiment 4 includes, in order from the object side, a negative meniscus lens L21d having a concave surface on the image plane side, a positive biconvex lens L22d having a smaller convex surface on the object side (i.e., the curvature radius on the object side of the positive biconvex lens L22d is smaller than the curvature radius on the image plane side thereof), and a negative biconcave lens L23d having a smaller concave surface on the image plane side (i.e., the absolute value of the curvature radius on the image plane side of the negative biconcave lens L23d is smaller than the absolute value of the curvature radius on the object side thereof).

The third lens group G3d of the zoom lens unit according to Embodiment 4 includes, in order form the object side, a negative biconcave lens L31d having a smaller concave surface on the image plane side (i.e., the absolute value of the curvature radius on the image plane side of the negative biconcave lens L31d is smaller than the absolute value of the curvature radius on the object side thereof), and a positive meniscus lens L32d having a convex surface on the object side.

The negative lens L31d and the positive lens L32d of the third lens group G3d are closely contacted and bonded to each other to form a cemented lens.

The aperture stop AS is interposed between the third lens group G3d and the fourth lens group G4d, and filters F such as an ND filter composed of parallel plate are also interposed therebetween adjacently to the aperture stop AS. The aperture stop AS and the filters F are integrally supported by the supporting member together with the fourth lens group G4d.

The fourth front lens group G41d, which is disposed on the object side than a position where a gap between the lenses in the fourth lens group G4d is the widest (in other words, the forth front lens group G41d, which is disposed between the aperture stop (AS) and the widest gap), includes, in order from the object side, a positive biconvex lens L41d having a smaller convex surface on the object side (i.e., the curvature radius on the object side of the positive biconvex lens L41d is smaller than the curvature radius on the image plane side thereof), a negative meniscus lens L42d having a concave surface on the image plane side, a positive biconvex lens L43d having a smaller convex surface on the image plane side (i.e., the curvature radius on the image plane side of the positive biconvex lens L43d is smaller than the curvature radius on the object side thereof), a negative biconcave lens L44d having a smaller concave surface on the object side (the absolute value of the curvature radius on the object side of the negative biconcave lens L44d is smaller than the absolute value of the curvature radius on the image plane side thereof), and a positive meniscus lens L45d having a convex surface on the object side.

The positive lens L43d and the negative lens L44d of the fourth front lens group G41d are closely contacted and bonded to each other to form a cemented lens.

Further, the fourth latter lens group G42d, which is disposed between the widest gap and the image plane, includes, in order from the object side, a negative meniscus lens L46d having a concave surface on the image plane side, and a positive meniscus lens L47d having a convex surface on the object side.

Optical filters such as an optical low-pass filter and an optical infrared cut-off filter, and/or a cover glass (sealing glass) of a photo acceptance element such as a CMOS imaging sensor and a CCD imaging sensor are disposed in the fourth latter lens group G42d. In the drawings, a filter FG is shown as an equivalent transparent parallel flat plate.

It is preferable to adjust the focusing by the first lens group G1d.

It is because the position of the first lens group G1d used for the focusing adjustments does not change for the whole zooming range even if the first lens group G1d is used to adjust the focusing.

In Embodiment 4, the total focal length f of the optical system changes from 15.45-70.30-320.04 mm the F-number F changes from 1.93-1.93-4.77, and a half-field angle ω changes from 18.79-3.88-0.83 degrees respectively when zooming from the wide-angle end to the telephoto end through the intermediate focal length. Optical characteristics of each optical element are shown in the following Table 19.

TABLE 19

| LENS SURFACE | R | D | N | ν | GLASS |
|---|---|---|---|---|---|
| 1 | 192.290 | 2.80 | 1.74950 | 35.33 | S-NBH51(OHARA) |
| 2* | 71.156 | 11.78 | 1.60300 | 65.44 | S-PHM53(OHARA) |
| 3 | −1216.324 | 0.50 | | | |
| 4 | 65.398 | 9.43 | 1.49700 | 81.54 | S-FPL51(OHARA) |
| 5 | 283.441 | DA | | | |
| 6 | 509.730 | 2.00 | 1.74950 | 35.28 | S-LAM7(OHARA) |
| 7 | 45.405 | 1.46 | | | |
| 8 | 47.464 | 10.47 | 1.75520 | 27.51 | S-TIH4(OHARA) |
| 9 | −189.709 | 4.75 | | | |
| 10 | −81.220 | 2.00 | 1.71300 | 53.87 | S-LAL8(OHARA) |
| 11 | 42.262 | DB | | | |
| 12 | −57.148 | 1.20 | 1.74950 | 35.28 | S-LAM7(OHARA) |
| 13 | 18.856 | 2.29 | 1.92286 | 18.90 | S-NPH2(OHARA) |
| 14 | 43.338 | DC | | | |
| 15 | AS | 0.50 | | | (AS) |
| 16 | 0.000 | 1.00 | 1.51633 | 64.14 | (F) |
| 17 | 0.000 | 0.50 | | | |
| 18 | 40.823 | 7.29 | 1.53775 | 74.70 | S-FPM3(OHARA) |
| 19 | −57.190 | 0.50 | | | |
| 20 | 87.364 | 1.00 | 1.51633 | 64.14 | S-BSL7(OHARA) |
| 21 | 23.810 | 2.03 | | | |
| 22 | 34.774 | 10.32 | 1.53775 | 74.70 | S-FPM3(OHARA) |
| 23 | −21.072 | 1.20 | 1.72000 | 41.98 | S-LAM58(OHARA) |
| 24 | 213.734 | 0.50 | | | |
| 25 | 28.020 | 7.19 | 1.49700 | 81.54 | S-FPL51(OHARA) |
| 26 | 4657.632 | 20.37 | | | |
| 27 | 17.997 | 1.22 | 1.48749 | 70.24 | S-FSL5(OHARA) |
| 28 | 13.256 | 2.98 | | | |
| 29 | −661.071 | 2.56 | 1.61293 | 37.00 | S-TIM3(OHARA) |
| 30 | −48.139 | 16.50 | | | |
| 31 | 0.000 | 3.50 | 1.51633 | 64.14 | FILTER(FG) |
| 32 | 0.000 | | | | |

In Embodiment 4, when zooming from the wide-angle end (WIDE) to the telephoto and (TELE) through the intermediate focal length (MEAN), the total focal length of the optical system, the F-number, the half-field angle ω, an interval (distance) DA between the first lens group G1d and the second lens group G2d, an interval (distance) DB between the second lens group G2d and the third lens group G3d, and an interval (distance) DC between the third lens group G3d and the aperture stop AS changes as shown in the following Table 20.

TABLE 20

| | Wide | Mean | Tele |
|---|---|---|---|
| f | 15.45 | 70.30 | 320.04 |
| F-NUMBER | 1.93 | 1.93 | 4.77 |
| ω | 18.79 | 3.88 | 0.83 |
| DA | 2.1601 | 54.2287 | 62.5299 |
| DB | 40.7927 | 2.5758 | 46.5168 |
| DC | 68.1961 | 54.3444 | 2.1022 |

A focal length of a diffraction lens surface (fdoe) is expressed by:

$$fdoe = -1/(2 \times C2)$$

where C2 is a coefficient of 2nd order in a phase function. In Embodiment 4, the coefficient C2 represents a phase relationship on the diffraction lens surface formed on the 2nd surface, i.e., the cemented surface 2 of the negative lens L11$d$ and the positive lens L12$d$, and the coefficient C2 becomes as shown in the following Table 21. In Table 21, a coefficient of 4th order in the phase function (C4) is also shown.

TABLE 21

| COEFFICIENTS IN PHASE FUNCTION | | | |
|---|---|---|---|
| LENS SURFACE | λ | C2 | C4 |
| 2 | 587.6 | −1.81245E−05 | 2.68392E−09 |

As mentioned above, a structure of the diffraction grating is expressed by:

$$\phi(h) = (2\pi/\lambda d)(C2 \cdot h^2 + C4 \cdot h^4)$$

where λd represents a reference wavelength (d-line), h represents a height from the optical axis, and φ(h) represents a phase.

In Embodiment 4, values fulfilling the conditions (1) to (9) are shown in the following Tables 22 and 23.

Specifically, Table 22 shows the values corresponding to the conditions (1) and (5) to (9), and Table 23 shows the values corresponding to the conditions (2) to (4).

TABLE 22

| CONDITIONS | | |
|---|---|---|
| (R411 − R422)/(R411 + R422) | 0.26 | (1) |
| Rcom/(N44 − N43)/f41 | −2.54 | (5) |
| f41/f42 | −0.71 | (6) |
| f43/f44 | −0.98 | (7) |
| f45/f44 | −2.13 | (8) |
| f1doe/f1 | 226.31 | (9) |

TABLE 23

| S-FPL53 | Nd | 1.43875 | (2) |
|---|---|---|---|
| | vd | 94.94 | (3) |
| | Pg, F − (−0.001802 × vd + 0.6483) | 0.057 | (4) |
| S-FPL51 | Nd | 1.49700 | (2) |
| | vd | 81.54 | (3) |
| | Pg, F − (−0.001802 × vd + 0.6483) | 0.036 | (4) |
| S-FPM2 | Nd | 1.59522 | (2) |
| | vd | 67.74 | (3) |
| | Pg, F − (−0.001802 × vd + 0.6483) | 0.018 | (4) |
| S-FPM3 | Nd | 1.53775 | (2) |
| | vd | 74.70 | (3) |
| | Pg, F − (−0.001802 × vd + 0.6483) | 0.026 | (4) |

Further a partial dispersion ratio $P_{g,F}$ corresponding to the condition (4) for each optical glass is shown in the following Table 24.

TABLE 24

| PARTIAL DISPERSION RATIOS OF THE POSITIVE LENS: $P_{gF}$ | |
|---|---|
| S-FPL51 | 0.5375 |
| S-FPL53 | 0.534 |
| S-FPM2 | 0.5442 |
| S-FPM3 | 0.5392 |

Figure 16:
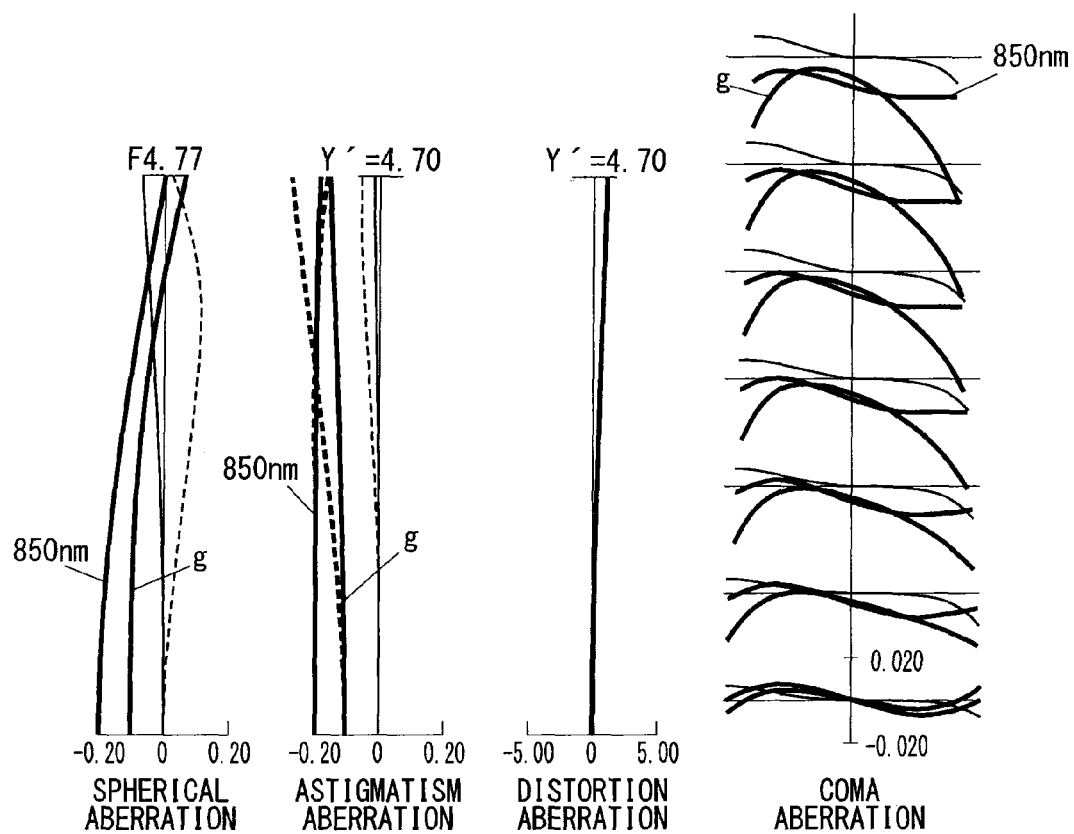
FIG. 16 shows graphs drawing curves of spherical aberration, astigmatism aberration, distortion aberration, and coma aberration at the telephoto end of the zoom lens unit according to Embodiment 4 shown in FIG. 13C.

FIGS. 14, 15, and 16 respectively show spherical aberration graphs, astigmatism aberration graphs, distortion aberration graphs, and coma aberration graphs at the wide-angle end, the intermediate focal length, and the telephoto end of the zoom lens unit according to Embodiment 4.

As clearly shown in FIGS. 14 to 16, the aberrations are corrected sufficiently in the zoom lens unit according to Embodiment 4. Also, the zoom lens unit according to Embodiment 4 has the resolving power compatible with the image pickup devices of 1,000,000 to 5,000,000 pixels. Therefore, it is possible to achieve high imaging performance and compactness by configuring a zoom lens unit in accordance with Embodiment 4.

Embodiment 5

A camera according to fifth Embodiment, which is configured to include the zoom lens unit according to any of Embodiments 1 to 4 as an imaging optical system for either still images or for videos, will be explained with reference to FIGS. 17 to 19.

Figure 17:
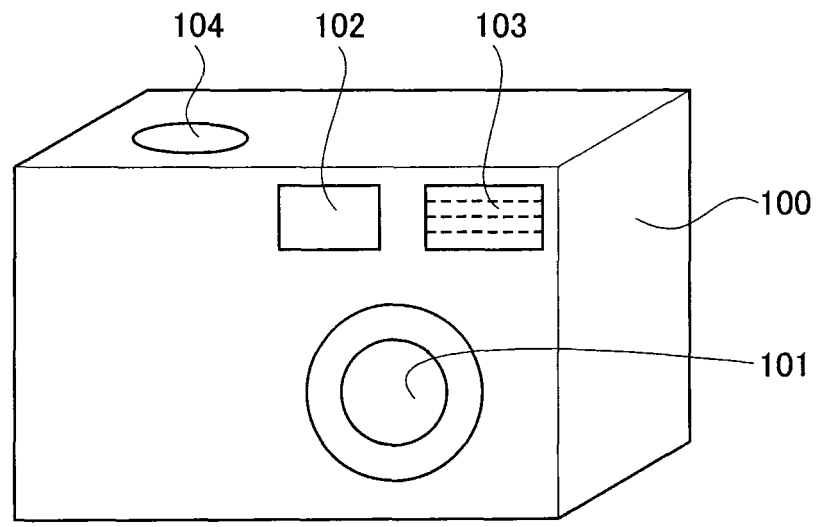
FIG. 17 is a diagrammatic perspective view from an object side (subject side) schematically showing an overall appearance of a digital camera according to Embodiment 5.
Figure 18:
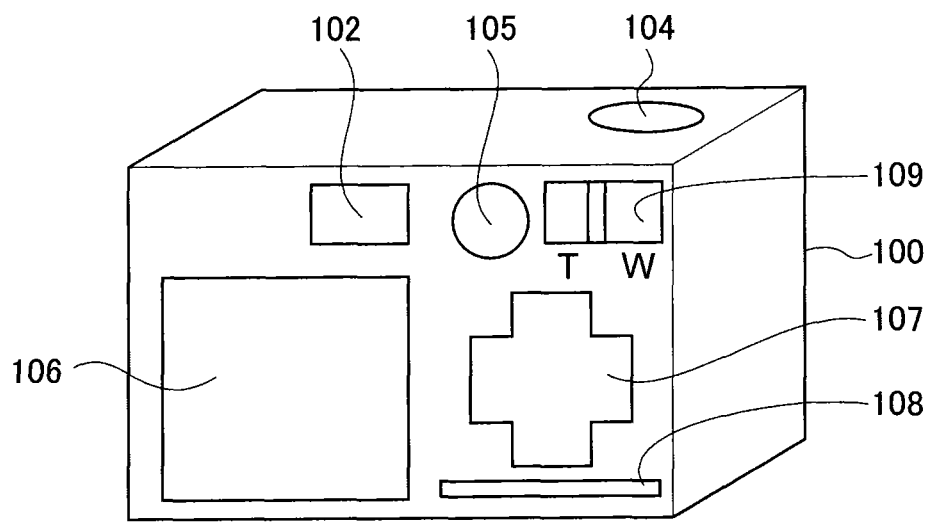
FIG. 18 is a diagrammatic perspective view from a photographing-person side schematically showing an overall appearance of the digital camera according to Embodiment 5.
Figure 19:
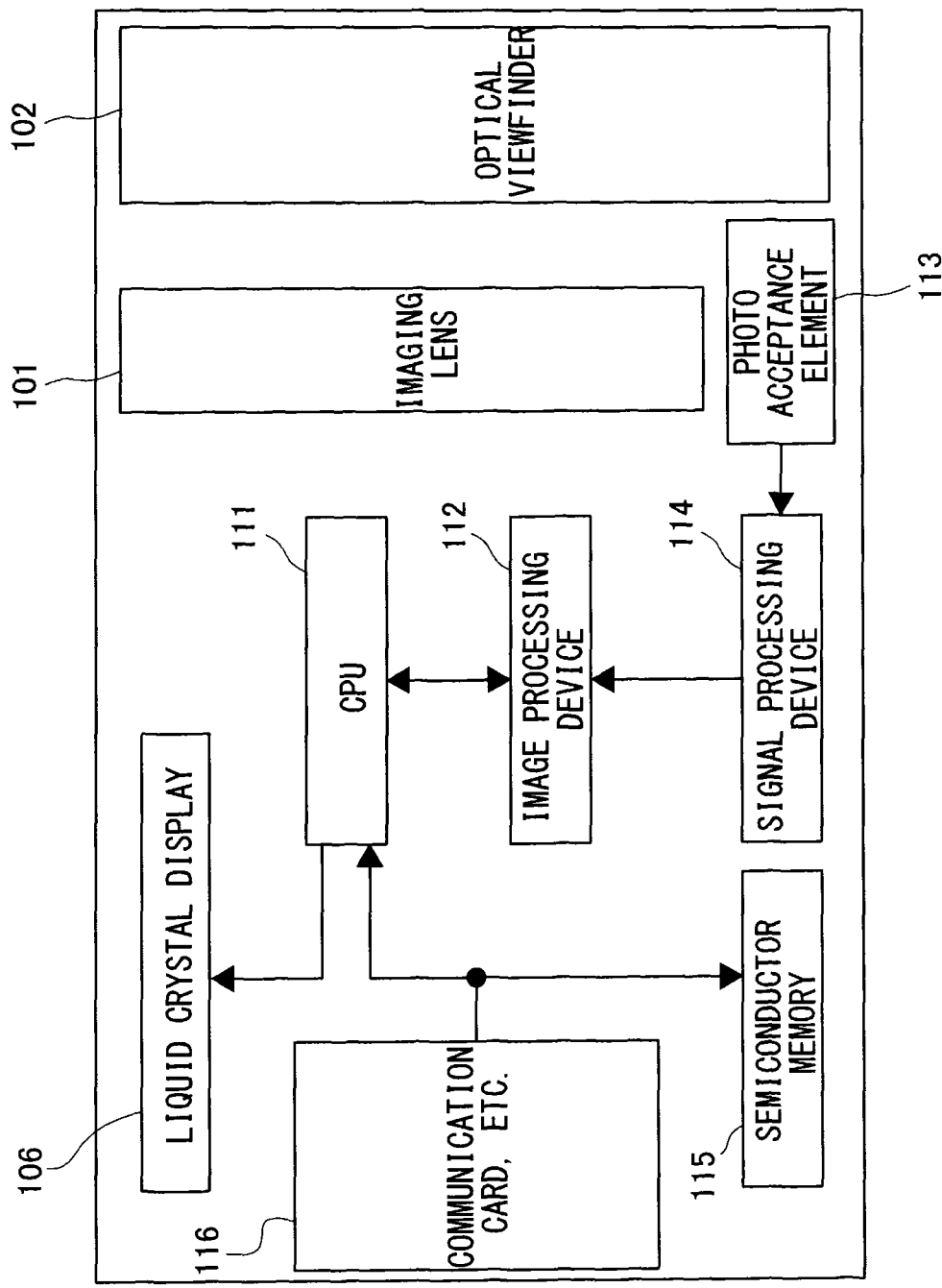
FIG. 19 is a function block diagram of the digital camera shown in FIGS. 17 and 18.

FIG. 17 is a diagrammatic perspective view from an object side schematically showing the overall appearance of a digital camera according to Embodiment 5, FIG. 18 is a diagrammatic perspective view from a photographing-person side schematically showing the overall appearance of the digital camera, and FIG. 19 is a function block diagram of the digital camera.

Although Embodiment 5 is explained using the digital camera in FIGS. 17 to 19, it is only an example and it is possible to include the zoom lens unit according to any of Embodiments 1 to 4 into a video camera, which is mainly used for videos (especially a monitoring video camera) or a camera, which is mainly used for still images such as a silver-salt film camera. Further, it is also common to include the digital camera into a portable information terminal device (e.g., a mobile phone or a personal data acquisition (PDA)) and/or a portable terminal device (e.g., a smart phone or an electronic tablet device).

Although the appearance may be different, since those portable devices substantially include the same function and configuration of the digital camera, etc., it is possible to use the zoom lens unit according to any of Embodiments 1 to 4 as an imaging optical system of the portable devices. As shown in FIGS. 17 and 18, the digital camera according to Embodiment 5 comprises an imaging lens (photographing lens) 101, an optical viewfinder 102, a stroboscope (electronic flash light) 103, a shutter button 104, a power switch 105, a liquid crystal display 106, an operation switch (button) 107, a memory card slot 108, and a zoom switch 109, etc. in a camera body (housing) 100. Further, as shown in FIG. 19, the digital camera is equipped with a central processing unit (CPU) 111, an image processing device 112, a photo acceptance element 113, signal processing device 114, a semiconductor memory 115, and a communication card, etc. 116 inside the camera body 100.

The digital camera includes the imaging lens 101 as an imaging optical system and the photo acceptance element 113 configured as an image sensor using a CMOS imaging element or a CCD imaging element, etc., and scans an optical image formed by the imaging lens 101 using the photo acceptance element 113. The digital camera 100 uses the zoom lens unit 1 according to any of Embodiments 1 to 4 as the imaging lens 101.

The signal processing device 114 controlled by the CPU 111 processes outputs from the photo acceptance element 113 and converts the outputs into a digital image data. The image processing device 112, which is also controlled by the CPU 111, performs a predetermined image processing on the converted digital image data, and the result (processed data) is stored into the semiconductor memory 115 such as a nonvolatile memory. The semiconductor memory 115 can be a memory card inserted to the memory card slot 108 or a built-in semiconductor memory installed on a circuit board of the digital camera. The liquid crystal display 106 can display an image being taken and/or an image stored in the semiconductor memory 115. The images stored in the semiconductor memory 115 can be transmitted to outside via the communication card, etc. 116, which is inserted to a communication card slot (although not particularly illustrated, it is possible to use the memory card slot 108 as the communication card slot as well).

A lens surface on the object side of the imaging lens 101 is covered by a lens barrier (not shown) when the camera is carried by a user. In contrast, the lens surface on the object side of the imaging lens 101 is exposed upon turning ON the power switch 105. The optical system (e.g., lenses) of the zoom lens unit 1 aligns to be, for example the arrangement at the wide angle end (short-focal length end) inside the lens barrel of the imaging lens 101 upon turning ON the power switch 105. The alignment of the optical system is changed to the arrangement at the telephoto end (long-focal length end) through the arrangement at the immediate focal length by operating the zoom switch 109.

The optical system of the optical viewfinder 102 may preferably change the magnification ratio along with the change in the filed angle of the imaging lens 101.

In most cases, focusing is adjusted by half-depressing the shutter button 104.

The focus of the zoom lens unit 1 according to any of Embodiments 1 to 4 of the present invention can be adjusted by partially moving the optical system (lens groups, etc.) composing the zoom lens unit 1. Photographing (taking an image) is executed by depressing the shutter button 104 fully, and the abovementioned processing is performed.

The operation switch 107 is operated (manipulated) to display an image stored in the semiconductor memory 115 on the liquid crystal display 106 or to transmit the stored image to outside via the communication card, etc. 116. The semiconductor memory 115 and the communication card, etc. 116 are used by inserting them to a corresponding dedicated slot such as the memory card slot 108 and the communication card slot or to a general (undedicated) slot.

Arranging each group of the imaging forming lenses apart from the optical axis should be acceptable when the imaging lens 101 is in a collapsed state. For instance, at least one of the second lens group G2 and third lens group G3 can intentionally deviate from the optical axis to be loaded in the lens barrel in parallel with the other lens groups when the imaging lens 101 is in the collapsed state. With this, it becomes possible to make the digital camera thinner.

As explained above, in Embodiment 5, it is configure to include the imaging lens 101 composed of the zoom lens unit according to any of Embodiments 1 to 4 as an imaging optical system. Therefore, it becomes possible to provide a high quality compact imaging device (e.g., a digital camera) or an information device (e.g., a portable information terminal device) in which the aberrations are sufficiently corrected and the resolution is compatible with the image pickup devices of 1,000,000 to 5,000,000 pixels or more.

Further, the configurations of the zoom lens units according to Embodiments 1 to 4 of the present invention is also applicable to an imaging lens of a conventional silver-salt film camera, a projection lens of a projector, and or a zoom lens of a monitoring camera Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A zoom lens unit comprising, in order from an object side to an image plane side:
    a first lens group with positive refractive power;
    a second lens group with negative refractive power;
    a third lens group with negative refractive power; and
    a fourth lens group with positive refractive power,
    wherein the first lens group and the fourth lens group are fixed, while the second lens group moves toward the image plane side and the third lens group moves when changing a magnification ratio from a wide-angle end to a telephoto end, and
    the fourth lens group includes, in order from the object side, a positive lens L41 having a convex surface on the object side, a negative lens L42 having a concave surface on an image side, a positive lens L43, a negative lens L44, and a positive lens L45, and fulfills a condition (1):

$$0.1 < (R411 - R422)/(R411 + R422) < 0.6 \quad (1)$$

where R411 represents a curvature radius of the object-side surface of the positive lens L41, and R422 represents a curvature radius of the image-side surface of the negative lens L42.

2. The zoom lens unit according to claim 1, wherein at least one of the positive lenses in the fourth lens group fulfills conditions (2) (3) and (4):

$$1.40 < N_d < 1.65 \quad (2)$$

$$65.0 < v_d < 100.0 \quad (3)$$

$$0.015 < P_{g,F} - (-0.001802 \times v_d + 0.6483) < 0.060 \quad (4)$$

where $N_d$ represents a refractive index, $v_d$ represents an Abbe number of said one of the positive lenses, and $P_{g,F}$ represents a partial dispersion ratio of said one of the positive lenses and is expressed as: $P_{g,F} = (n_g - n_F)/(n_F - n_C)$, where $n_g$, $n_F$, and $n_C$ represent refractive indexes at g-line, F-line, and C-line of said one of the positive lenses respectively.

3. The zoom lens unit according to claim 2, wherein at least two of the positive lenses in the fourth lens group fulfill the conditions (2) (3) and (4).

4. The zoom lens unit according to claim 1, wherein the positive lens L43 and the negative lens L44 in the fourth lens group are cemented, and a condition (5) is fulfilled:

$$-4.0 < Rcom/(N44 - N43)/f41 < -1.0 \quad (5)$$

where Rcom represents a curvature radius of the cemented surface of a cemented lens composed of the positive lens L43 and the negative lens L44, N43 represents a refractive index of the positive lens L43 in the fourth lens group, N44 represents a refractive index of the negative lens L44 in the fourth lens group, and f41 represents a focal length of the positive lens L41 in the fourth lens group.

5. The zoom lens unit according to claim 1, wherein a condition (6) is fulfilled:

$$-0.8 < f41/f42 < -0.4 \quad (6)$$

where f41 represents a focal length of the positive lens L41 in the fourth lens group, and f42 represents a focal length of the negative lens L42 in the fourth lens group.

6. The zoom lens unit according to claim 1, wherein conditions (7) and (8) are fulfilled:

$$-1.2 < f43/f44 < -0.7 \quad (7)$$

$$-2.5 < f45/f44 < -1.5 \quad (8)$$

where f43 represents a focal length of the positive lens L43 in the fourth lens group, f44 represents a focal length of the negative lens L44 in the fourth lens group, and f45 represents a focal length of the positive lens L45 in the fourth lens group.

7. The zoom lens unit according to claim 1, wherein the fourth lens group is divided into a forth front lens group which is disposed on the object side than a position where a gap between the lenses in the fourth lens group is widest, and a forth latter lens group which is disposed between said position and the image, the fourth front lens group includes the positive lens L41 having the convex surface on the object side, the negative lens L42 having the concave surface on the image side, the positive lens L43, the negative lens L44, and the positive lens L45, and the fourth latter lens group includes a negative lens L46 and a positive lens L47.

8. The zoom lens unit according to claim 1, wherein the first lens group has a diffraction lens surface, and a condition (9) is fulfilled:

$$100 < f1doe/f1 < 400 \quad (9)$$

where f1doe represents a focal length of the diffraction lens surface in the first lens group, and f1 represents a focal length of the first lens group.

9. A camera comprising the zoom lens unit according to claim 1 as an imaging optical system for a still image.

10. A camera comprising the zoom lens unit according to claim 1 as an imaging optical system for a video.

* * * * *